United States Patent
Mori et al.

(10) Patent No.: US 11,733,114 B2
(45) Date of Patent: Aug. 22, 2023

(54) ELECTROSTATIC CAPACITANCE DETECTION DEVICE CAPABLE OF CALCULATING SHEAR FORCE

(71) Applicant: Nissha Co., Ltd., Kyoto (JP)

(72) Inventors: Fujio Mori, Kyoto (JP); Katsumi Tokuno, Kyoto (JP); Youichi Yamaguchi, Kyoto (JP); Eiko Seki, Kyoto (JP); Yuji Watazu, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 269 days.

(21) Appl. No.: 17/278,634

(22) PCT Filed: Sep. 18, 2019

(86) PCT No.: PCT/JP2019/036625
§ 371 (c)(1),
(2) Date: Mar. 22, 2021

(87) PCT Pub. No.: WO2020/059766
PCT Pub. Date: Mar. 26, 2020

(65) Prior Publication Data
US 2022/0042866 A1    Feb. 10, 2022

(30) Foreign Application Priority Data

| Sep. 20, 2018 | (JP) | ................................. | 2018-176664 |
| Sep. 20, 2018 | (JP) | ................................. | 2018-176665 |
| Sep. 20, 2018 | (JP) | ................................. | 2018-176666 |
| Sep. 20, 2018 | (JP) | ................................. | 2018-176667 |
| Sep. 20, 2018 | (JP) | ................................. | 2018-176669 |
| Sep. 21, 2018 | (JP) | ................................. | 2018-176955 |
| Mar. 11, 2019 | (JP) | ................................. | 2019-044259 |

(Continued)

(51) Int. Cl.
*G01L 5/165* (2020.01)
*B60C 23/06* (2006.01)
*G01L 1/14* (2006.01)

(52) U.S. Cl.
CPC ............ *G01L 5/165* (2013.01); *B60C 23/064* (2013.01); *G01L 1/146* (2013.01)

(58) Field of Classification Search
CPC . G01L 1/14; G01L 1/146; G01L 5/165; B60C 23/064; B60C 19/00; G01M 17/02;
(Continued)

(56) References Cited

U.S. PATENT DOCUMENTS

| 4,266,263 A | 5/1981 | Haberi et al. |
| 4,644,801 A | 2/1987 | Kustanovich |

(Continued)

FOREIGN PATENT DOCUMENTS

| DE | 10006534 A1 * | 10/2001 | ............... G01B 7/22 |
| JP | S53-112784 | 10/1978 | |

(Continued)

*Primary Examiner* — Octavia Davis Hollington
(74) *Attorney, Agent, or Firm* — JCIPRNET

(57) ABSTRACT

An electrostatic capacitance detection device is provided, which is provided with a first electrode, an insulating layer on the first electrode, and a second electrode on the insulating layer, the electrostatic capacitance detection device being configured to calculate a shear force applied from above an upper portion of the second electrode.

9 Claims, 14 Drawing Sheets

(30) Foreign Application Priority Data

Mar. 14, 2019 (JP) .................................. 2019-047776
Aug. 20, 2019 (JP) .................................. 2019-150742

(58) Field of Classification Search
CPC ...... G06F 3/0443; G06F 3/0446; G06F 3/044; G06F 3/0412

See application file for complete search history.

(56) References Cited

U.S. PATENT DOCUMENTS

| | | | |
|---|---|---|---|
| 4,827,763 A * | 5/1989 | Bourland | A61B 5/6892 |
| | | | 73/172 |
| 4,836,033 A | 6/1989 | Seitz | |
| 6,499,351 B1 | 12/2002 | Enomoto et al. | |
| 9,229,592 B2 * | 1/2016 | Bulea | G06F 3/04142 |
| 9,347,838 B2 * | 5/2016 | Chen | G01L 1/142 |
| 10,309,845 B2 * | 6/2019 | Hall | G01L 1/16 |
| 2014/0150572 A1 * | 6/2014 | Lim | G06F 3/0338 |
| | | | 73/862.626 |
| 2014/0298921 A1 * | 10/2014 | Surapaneni | G01L 1/146 |
| | | | 73/862.041 |
| 2016/0015311 A1 * | 1/2016 | Jiang | G01L 5/164 |
| | | | 600/592 |
| 2017/0016783 A1 * | 1/2017 | Hall | G01L 1/148 |
| 2017/0176266 A1 | 6/2017 | Mathieu et al. | |
| 2018/0073942 A1 | 3/2018 | Wu et al. | |
| 2018/0356299 A1 | 12/2018 | Watazu et al. | |
| 2019/0113406 A1 | 4/2019 | Takemoto et al. | |

FOREIGN PATENT DOCUMENTS

| | | | | |
|---|---|---|---|---|
| JP | S63-171334 | | 7/1988 | |
| JP | 2000-283866 | | 10/2000 | |
| JP | 2010051359 | | 3/2010 | |
| JP | 4565359 | | 10/2010 | |
| JP | 2011257217 | | 12/2011 | |
| JP | 2013205197 | | 10/2013 | |
| JP | 2015-187561 | | 10/2015 | |
| JP | 2017-156126 | | 9/2017 | |
| JP | 2017156126 | * | 9/2017 | |
| JP | 2017-203705 | | 11/2017 | |
| JP | 2018-048963 | | 3/2018 | |
| JP | 2018-072041 | | 5/2018 | |
| JP | 2020046387 A | * | 3/2020 | ............ B60C 19/00 |
| JP | 6837702 B1 | * | 3/2021 | |
| WO | WO 2014/208294 | | 12/2014 | |
| WO | WO 2017/149884 A1 | | 9/2017 | |
| WO | WO-2023276390 A1 | * | 1/2023 | |

* cited by examiner

CONNECTION WIRING DIAGRAM

CONFIGURATION

OPERATION EXAMPLE (IN CASE OF AND)

ELECTROSTATIC CAPACITANCE DETECTION DEVICE CAPABLE OF CALCULATING SHEAR FORCE

CROSS REFERENCES TO RELATED APPLICATIONS

This application is a continuation of International Application No. PCT/JP2019/036625, filed on Sep. 18, 2019, which claims priority to the following Japanese Patent Applications: 2018-176664, filed on Sep. 20, 2018; 2018-176665, filed on Sep. 20, 2018; 2018-176666, filed on Sep. 20, 2018; 2018-176667, filed on Sep. 20, 2018; 2018-176669, filed on Sep. 20, 2018; 2018-176955, filed on Sep. 21, 2018; 2019-044259, filed on Mar. 11, 2019; 2019-047776, filed on Mar. 14, 2019; and 2019-150742, filed on Aug. 20, 2019, as well as which are incorporated herein by reference.

TECHNICAL FIELD

The present disclosure relates to an electrostatic capacitance detection device used in a device for measuring ground contact conditions of tires, shoe soles, track points, or the like.

BACKGROUND

Conventionally, the invention disclosed in Patent Document 1 is a known method for measuring ground contact conditions or the like of tires. The invention includes a substrate including a surface for allowing a tire to contact a road surface, an electrostatic capacitance detection device disposed on the surface of the substrate and having a plurality of pressure measurement points, a protecting sheet covering a surface of the electrostatic capacitance detection device, and the like. The electrostatic capacitance detection device is an invention configured to be filled with resin having electric resistance that decreases depending on the amount of deformation when compressed between a first linear electrode and a second linear electrode.

In addition, the electric resistance of the resin decreases when the force pressing the outer surface of the sheet increases. Accordingly, the sheet is pressed at an intersection point in a plan view between the first linear electrode and the second linear electrode, and thus electric resistance between the first linear electrode and the second linear electrode decreases. Consequently, the electric resistance is measured, and thus the force acting on the resin at the intersection point can be measured, and the ground contact surface shape and ground contact pressure distribution of the tire are obtained.

CITATION LIST

Patent Literature

Patent Document 1: JP 2018-72041 A

SUMMARY

Problems to be Solved by the Present Disclosure

However, the component that can be detected by the force acting on the resin at the intersection point is only a component in a Z-axis direction (perpendicular to the linear electrode), and components in XY-axes directions (a direction in which the tire moves is the X axis, and a direction perpendicular to the X axis is the Y-axis) cannot be detected. In other words, in the electrostatic capacitance detection device configured as just described, only the ground contact pressure distribution in the Z-axis can be obtained, and the ground contact pressure distribution of stress (hereinafter referred to as "shear force") in the XY-axes directions obliquely applied by the tire to the ground contact surface cannot be measured. Therefore, the true ground contact condition of the tire with the ground contact surface may not be measured, and there is a problem that the electrostatic capacitance detection device is inadequate as a test device that measures performance or the like of the tire.

The present disclosure is thus conceived in view of the problem described above, and is a device capable of calculating not only stress of a component in the Z-axis direction but also shear force applied obliquely from above an upper portion of a second electrode. The present disclosure is an electrostatic capacitance detection device, in which, as the principle, the second electrode or the like is deformed or transversely moved in accordance with the magnitude of the shear force, and a generated change of an electrostatic capacitance value between the second electrode deformed or transversely moved and a first electrode is detected to calculate the magnitude of an initial shear force from the magnitude of the change of the electrostatic capacitance value. The present disclosure can be used in a device for measuring true ground contact conditions of tires, shoe soles, track points, or the like.

Features for Solving the Problems

In other words, a first aspect of the present disclosure is an electrostatic capacitance detection device formed with a first electrode, an insulating layer on the first electrode, and a second electrode on the insulating layer, and the electrostatic capacitance detection device is configured to calculate a shear force applied from above an upper portion of the second electrode.

Further, a second aspect of the present disclosure is the electrostatic capacitance detection device in that the insulating layer is formed of a plurality of layers having different physical properties or chemical properties. Furthermore, a third aspect of the present disclosure is the electrostatic capacitance detection device in that the insulating layer has gradation. In addition, a fourth aspect of the present disclosure is the electrostatic capacitance detection device in that the insulating layer has a Poisson ratio of 0 to 0.48.

Moreover, a fifth aspect of the present disclosure is the electrostatic capacitance detection device in that the first electrode and the second electrode are formed of linear patterns, and the linear patterns are patterns extending in the same direction in a plan view. Further, a sixth aspect of the present disclosure is the electrostatic capacitance detection device in that the first electrode is formed of an island-shaped pattern, the second electrode is formed of two layers of an upper electrode and a lower electrode, the upper electrode and the lower electrode are formed of a plurality of linear patterns intersecting in a plan view, and a portion of the island-shaped pattern of the first electrode overlaps with a portion of the pattern of the upper electrode and a portion of the pattern of the lower electrode in a plan view. Furthermore, a seventh aspect of the present disclosure is the electrostatic capacitance detection device in that a region where a portion of the island-shaped pattern of the first electrode overlaps with a portion of the pattern of the upper electrode in a planer view is larger than a region where a portion of the island-shaped pattern of the first electrode overlaps with a portion of the pattern of the lower electrode in a planer view.

Moreover, an eighth aspect of the present disclosure is the electrostatic capacitance detection device in that the first electrode is connected via an individual AC (alternating current) drive circuit to a processing unit, and the second electrode is connected via a signal conversion unit to the processing unit. In addition, a ninth aspect of the present disclosure is the electrostatic capacitance detection device in that a temperature sensor configured to measure heat generated by a pressing body applied from above the second electrode is provided in any of the layers. Additionally, a tenth aspect of the present disclosure is the electrostatic capacitance detection device in that a frame portion is not present in either one of two directions orthogonal to the surroundings of a sensing unit of the first electrode or the second electrode.

Advantageous Effects of Disclosure

An electrostatic capacitance detection device according to the present disclosure is formed with a first electrode, an insulating layer on the first electrode, and a second electrode on the insulating layer, and the electrostatic capacitance detection device is configured to calculate a shear force applied from above an upper portion of the second electrode. Therefore, not only the conventional distribution of ground contact pressure in the Z-axis direction, but also the distribution of ground contact pressure of the shear force obliquely applied can be measured, thus real ground contact conditions of grounded bodies such as tires and shoe soles with the ground contact surface can be measured. Advantageously, true performances or the like of the grounded bodies can be measured.

Further, the electrostatic capacitance detection device according to the present disclosure is configured such that the insulating layer is formed of a plurality of layers having different physical properties or chemical properties. Furthermore, the electrostatic capacitance detection device according to the present disclosure is configured such that the insulating layer has gradation. Therefore, the measurement value of the shear force can be accurately measured, and the durability of the insulating layer is advantageously improved. In addition, the electrostatic capacitance detection device according to the present disclosure is configured such that the insulating layer has a Poisson ratio of 0 to 0.48. Accordingly, noise generated on the periphery of a stress contact point by the deflection of the shear force can be reduced, and the detection of pressure in the Z-axis direction and the detection of shear force in the XY-axes directions are easily distinguished. Therefore, the accuracy of detection data is advantageously improved.

Moreover, the electrostatic capacitance detection device according to the present disclosure is configured such that the first electrode and the second electrode are formed of linear patterns, and the linear patterns are patterns extending in the same direction in a plan view. Accordingly, when a shear force is applied from an angle direction intersect with a direction in which the linear pattern of the second electrode extends, the second electrode deforms in accordance with the magnitude of the shear force, and the distance between the second electrode and the first electrode changes. Since the electrostatic capacitance value between the second electrode and the first electrode changes with the change of the distance between the second electrode and the first electrode, the magnitude of the shear force can be advantageously detected by detecting the electric signal.

Further, the electrostatic capacitance detection device according to the present disclosure is configured such that the first electrode is formed of an island-shaped pattern, the second electrode is formed of two layers of an upper electrode and a lower electrode, the upper electrode and the lower electrode are formed of a plurality of linear patterns intersecting in a plan view, and a portion of the island-shaped pattern of the first electrode overlaps with a portion of the pattern of the upper electrode and a portion of the pattern of the lower electrode in a plan view. Accordingly, when a shear force is applied from an angle direction intersect with a direction of either the upper electrode or the lower electrode of the second electrode, the upper electrode or the lower electrode of the second electrode deforms or moves in accordance with the magnitude of the shear force, and the distance between the second electrode and the first electrode changes. Since the electrostatic capacitance value between the upper electrode or the lower electrode of the second electrode and the first electrode changes with the change of the distance between the second electrode and the first electrode, the magnitude of the shear force in each direction (the magnitude of a component force of the shear force in the X-axis direction and the magnitude of a component force of the shear force in the Y-axis direction) can be advantageously detected by detecting the electric signal.

Furthermore, the electrostatic capacitance detection device according to the present disclosure is configured such that a region where a portion of the island-shaped pattern of the first electrode overlaps with a portion of the pattern of the upper electrode in a planer view is larger than a region where a portion of the island-shaped pattern of the first electrode overlaps with a portion of the pattern of the lower electrode in a planer view. Accordingly, the detection sensitivity of an electrostatic capacitance value between the first electrode formed of the island-shaped pattern and the upper electrode is typically low compared with the lower electrode, however, the detection sensitivity between the first electrode and the upper electrode can be corrected to be approximately the same as that between the first electrode and the lower electrode. As a result, the shear force applied to the upper portion of the second electrode can be measured in a balanced manner in the X direction and the Y direction.

Moreover, the electrostatic capacitance detection device according to the present disclosure is configured such that the first electrode is connected via an individual AC drive circuit to a processing unit, and the second electrode is connected via a signal conversion unit to the processing unit. Accordingly, since each of electrodes of the first electrode having a complex and fine pattern is electrically connected to the processing unit via the individual AC drive circuit having a complex and fine pattern therefore, an electrostatic capacitance value in each of very fine ranges can be detected. Thus, advantageously, highly accurate measurements can be made.

In addition, the electrostatic capacitance detection device according to the present disclosure is configured such that a temperature sensor configured to measure heat generated by the shear force is provided in any of the layers Therefore, the temperature sensor can advantageously correct temperature-dependent errors in the distribution of measured shear forces and calculate the distribution of true shear forces. Additionally, the amount of loss of energy due to heat can be estimated. Therefore, what is the state of the ground contact surface where the amount of loss is small can be measured, and the research and development of energy-efficient products can be advantageously promoted.

Further, the electrostatic capacitance detection device according to the present disclosure is configured such that a frame portion is not present in either one of two directions orthogonal to the surroundings of a sensing unit of the first electrode or the second electrode. Therefore, a plurality of the electrostatic capacitance detection devices is arranged and connected together into an elongated shape, and thus advantageously, the measurement range of the shear force in the elongated direction can be increased maximally.

Furthermore, the electrostatic capacitance detection device according to the present disclosure is configured such that the substrate or the insulating layer formed with the first electrode or the second electrode, or a protecting layer protecting the substrate, the insulating layer, the first electrode, and the second electrode are removable. Therefore, even in a case where the protecting layer or the like on the surface is worn off, the measurement can be continued only by replacing the protecting layer. In addition, even in a case where the electrode is damaged to be unusable, only the substrate on which the electrode is formed is simply replaced, and thus measurement can be continue. As a result, a significant cost reduction can be advantageously attained without needing to procure another new electrostatic capacitance detection device. In addition, since the duration during which the single electrostatic capacitance detection device can be continuously used is increased, errors in measurements due to variations between each of the products of the electrostatic capacitance detection device are reduced. And thus, the accuracy of the measurements is advantageously improved.

BRIEF DESCRIPTION OF DRAWINGS

FIG. 8(a) is a schematic plan view illustrating a case where the first electrode and the second electrode are in the linear patterns having different widths and lengths from each other; FIG. 8(b) is a schematic plan view illustrating a case where the first electrode and the second electrode are formed in a partially wide shape and a partially narrow shape; FIG. 8(c) is a schematic plan view illustrating a case where the first electrode and the second electrode are formed in a polygonal shape and an arc shape; and FIG. 8(d) is a schematic plan view illustrating a case where the first electrode and the second electrode are formed in a shape combined thereof and a wave shape.

FIG. 9-1 is a cross-sectional view illustrating the electrostatic capacitance detection device in a case where each of the first electrode and the second electrode of the electrostatic capacitance detection device according to an embodiment of the present disclosure is formed of two layers.

FIG. 9-2 illustrates, in a case where each of the first electrode and the second electrode of the electrostatic capacitance detection device according to an embodiment of the present disclosure is formed of two layers, FIG. 9-2(a) a plan view illustrating the pattern of each of the layers of the second electrodes; and FIG. 9-2(b) a plan view illustrating the pattern of each of the layers of the first electrode.

FIG. 12-1 is a cross-sectional view illustrating the electrostatic capacitance detection device in a case where the first electrode has an island-shaped pattern having a rectangular shape, and the second electrode includes two layers of an upper electrode and a lower electrode that are formed of a plurality of linear patterns of the upper electrodes and the lower electrodes intersect with one another, in the electrostatic capacitance detection device according to an embodiment of the present disclosure.

FIG. 12-2 is a plan view illustrating the patterns of the upper electrodes and the lower electrodes of the second electrode in a case where the first electrode has an island-shaped pattern having a rectangular shape, and the second electrode includes two layers of the upper electrode and the lower electrode that are formed of a plurality of linear patterns of the upper electrodes and the lower electrodes intersect with one another, in the electrostatic capacitance detection device according to an embodiment of the present disclosure.

FIG. 12-3 is a plan view illustrating the patterns of the first electrode and the upper electrodes and the lower electrodes of the second electrode and the positional relationship thereof in a case where the first electrode has an island-shaped pattern having a rectangular shape, and the second electrode includes two layers of the upper electrode and the lower electrode that are formed of a plurality of linear patterns of the upper electrodes and the lower electrodes intersect with one another, in the electrostatic capacitance detection device according to an embodiment of the present disclosure.

FIG. 12-4 is a plan view illustrating overlapping regions of the first electrode with the upper electrode and the lower electrode of the second electrode in a case where the first electrode has an island-shaped pattern having a rectangular shape, and the second electrode includes two layers of the upper electrode and the lower electrode that are formed of a plurality of linear patterns of the upper electrodes and the lower electrodes intersect with one another, in the electrostatic capacitance detection device according to an embodiment of the present disclosure.

FIG. 12-5 is a plan view illustrating a state where the overlapping region of the first electrode with the upper electrode of the second electrode is changed when shear force is applied in a case where the first electrode has an island-shaped pattern having a rectangular shape, and the second electrode includes two layers of the upper electrode and the lower electrode that are formed of a plurality of linear patterns of the upper electrodes and the lower electrodes intersect with one another, in the electrostatic capacitance detection device according to an embodiment of the present disclosure.

FIG. 12-6 is a plan view illustrating a state where the overlapping region of the first electrode with the lower electrode of the second electrode is changed when shear force is applied in a case where the first electrode has an island-shaped pattern having a rectangular shape, and the second electrode includes two layers of the upper electrode and the lower electrode that are formed of a plurality of linear patterns of the upper electrodes and the lower electrodes intersect with one another, in the electrostatic capacitance detection device according to an embodiment of the present disclosure.

FIG. 15-1 is a plan view illustrating a case in which the first electrode has an island-shaped pattern having an elongated oval shape, and the second electrode includes two layers of the upper electrode and the lower electrode that are formed of a plurality of linear patterns of the upper electrodes and the lower electrodes intersect with one another, in the electrostatic capacitance detection device according to an embodiment of the present disclosure.

FIG. 15-2 is a plan view illustrating a state in which the first electrode has an island-shaped pattern having an elongated oval shape, and an overlapping region of the first electrode with the pattern of the upper electrode of the second electrode is changed when shear force is applied, in the electrostatic capacitance detection device according to an embodiment of the present disclosure.

DETAILED DESCRIPTION

Figure 1:
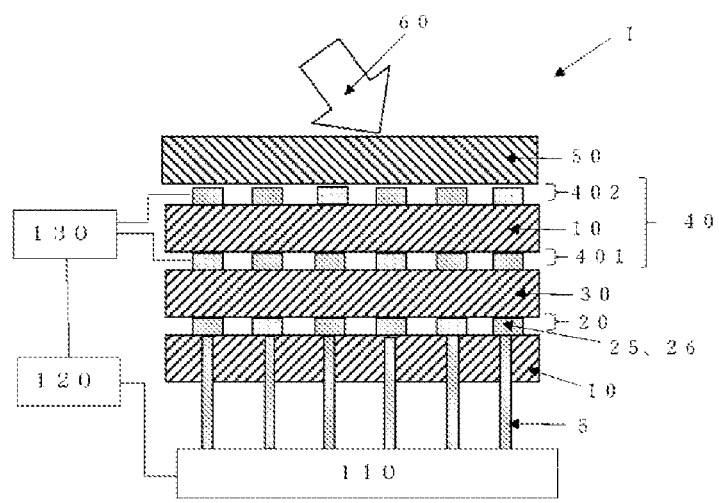
FIG. 1 is a cross-sectional view of an entire electrostatic capacitance detection device according to an embodiment of the present disclosure.

Hereinafter, an embodiment of the present disclosure will be described with reference to the drawings. An electrostatic capacitance detection device 1 according to the present disclosure is an electrostatic capacitance detection device in which a first electrode 20 is formed on a substrate 10, an insulating layer 30 is formed on the first electrode 20, a second electrode 40 is formed on the insulating layer 30, and a shear force 60 applied obliquely from above the second electrode 40 can be calculated. Further, a protecting layer 50 is formed on the second electrode 40, and the electrostatic capacitance detection device 1 may be configured such that the shear force 60 is applied from above the protecting layer 50. In addition, the first electrode 20 and the second electrode 40 of the electrostatic capacitance detection device 1 are configured to be electrically connected respectively via separate electric wiring lines to a processing unit 120, and a change of an electrostatic capacitance value generated between the first electrode 20 and the second electrode 40 is detected by the processing unit 120 (see FIG. 1).

When the shear force 60 is applied obliquely from above the second electrode 40 or the protecting layer 50 of the electrostatic capacitance detection device 1, the second electrode 40, which is a main detection unit of the electrostatic capacitance detection device 1, deforms or moves in accordance with the intensity of the shear force 60, and an electrostatic capacitance value generated between the first electrode 20 and the second electrode 40 changes. The intensity of the applied shear force 60 can be calculated from a change of the electrostatic capacitance value. For example, the first electrode 20 includes an electrode 25 and an electrode 26 which are formed of a plurality of linear patterns, and the second electrode 40 includes an electrode 41 and electrode 42 which are formed of a plurality of linear patterns. In such a case, when the shear force 60 is applied obliquely from the upper direction of the second electrode 40, one electrode 41 of the second electrode 40 is deformed or moved by the applied shear force 60 in accordance with the intensity of the shear force 60, and not only one electrode 21 among the first electrodes 20 located obliquely below the electrode 41 but also a distance between the electrode 21 and an electrode 22 adjacent to the electrode 21 changes. Accordingly, a change of an electrostatic capacitance value between the electrode 41 and the electrode 21 and a change of an electrostatic capacitance value between the electrode 41 and the electrode 22 are measured, and thus the intensity of the shear force 60 in the oblique direction can be measured (see FIG. 2).

Next, the insulating layer 30 will be described. The insulating layer 30 is preferably formed of a plurality of layers having different physical properties or chemical properties. Physical properties are properties such as density, hardness, specific gravity, melting point, boiling point, specific heat, dielectric constant, magnetic permeability, magnetic susceptibility, electric conductivity, refractive index, odor, and color of a material, which are inherent to the substance, or properties such as elastic modulus, shear strength, tensile fracture nominal strain, tensile strength, impact resistance, wear resistance, compressibility, compressive strength, bending strength, yield stress, and tensile strength, which are properties against an external load. Also, in a case where there are other substances, chemical properties are properties that promotes reaction with the other substances to transform into new substances having different properties.

Figure 3:
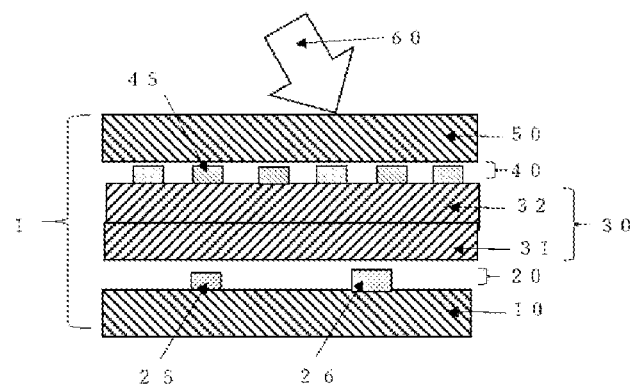
FIG. 3 is a cross-sectional view illustrating an embodiment in which, in an insulating layer of the electrostatic capacitance detection device according to an embodiment of the present disclosure, the insulating layer is formed of a two-layer laminate.

By using the elastic modulus as an example, the insulating layer 30 is formed in a two-layer structure in which an insulating layer 32 having a low elastic modulus is stacked on an insulating layer 31 having a high elastic modulus (see FIG. 3). The insulating layer 32 having a low elastic modulus is sensitively deformed in accordance with deflection caused by the applied shear force, and the insulating layer 31 having a high elastic modulus is prevented from being excessively deformed, and thus the underlying first electrode 20 is advantageously protected from breaking or deteriorating. Further, since displacement that causes errors of a measurement value of the shear force 60 in the oblique direction is reduced, the measurement value of the shear force 60 can be advantageously measured accurately. Furthermore, as a result of improvement in the measurement accuracy, the sampling speed is also advantageously increased.

The elastic modulus in an embodiment of the present disclosure is referred to as a value obtained by cutting the insulating layer 31 and the insulating layer 32 into the shape of a dumbbell No. 1 test piece, using a non-contact extensometer that can measure minute displacement, and dividing tensile stress applied to the insulating layer 31 and the insulating layer 32 in the tensile testing method conforming to JIS (Japanese Industrial Standard) K7127 and JIS K7161, by strain generated in the insulating layer 31 and the insulating layer 32. The insulating layer 30 formed of the plurality of layers may be a layer formed of not only two layers as described above but also three or more layers. In addition, whether the elastic modulus of each of the layers of the insulating layer 30 is high or low is determined by a relative comparison, and merely indicates that the elastic modulus of the insulating layer 32 is simply low compared with the elastic modulus of the insulating layer 31 and does not indicate that the absolute value of the elastic modulus of each layer is high or low.

In other words, when the insulating layer is formed of a laminate in which two layers are stacked, for example, the elastic modulus of the insulating layer 31 may be 2 GPa and the elastic modulus of the insulating layer 32 may be 1 GPa. The elastic modulus of the insulating layer 31 may be 0.3 GPa, and the elastic modulus of the insulating layer 32 may be 0.01 GPa. The ratio of the elastic modulus of the insulating layer 31 to the elastic modulus of the insulating layer 32 is preferably set in a range of 1.1 to 200. When the ratio of the elastic modulus of the insulating layer 31 to the elastic modulus of the insulating layer 32 is less than 1.1, a problem arises in which deformation caused by the shear force 60 runs through the insulating layer 30 to the first electrode 20, and thus the first electrode 20 may be easily deteriorated or damaged, Meanwhile, when the ratio exceeds 200, a problem arises in which deformation caused by the shear force 60 is absorbed only by the insulating layer 32. Accordingly, the mechanical strength is reduced by a cumulative load of the insulating layer 32, and thus the durability of the insulating layer 32 may be reduced.

In a case where the insulating layer is formed of three or more layers, the ratio of the elastic modulus of the insulating layer 31 in contact with the first electrode 20 to the insulating layer 32 in contact with the second electrode 40 is preferably set in a range of 2 to 2000 in the same way as the aforementioned insulating layer of two layers. In addition, the elastic modulus of an insulating layer formed between the insulating layer 31 and the insulating layer 32 is preferably set to be a value intermediate between the elastic modulus of the insulating layer 31 and the elastic modulus of the insulating layer 32. Moreover, even when the material and thickness of the insulating layer 31 are the same as those of the insulating layer 32, counterbore-shaped recesses and protrusions are formed on the surface of the insulating layer 30 as described below, and thus the elastic modulus of the insulating layer 32 can be lower than the elastic modulus of the insulating layer 31.

Further, the insulating layer 30 may have gradation. For example, when the insulating layer 30 is configured to have gradation in numerical values of physical properties such as elastic modulus, material density, hardness, and shear strength, or chemical properties, distortion generated in the insulating layer by internal stress can be reduced adequately. Therefore, the load of the shear force applied to the insulating layer can be reduced, which allows for improvement of the durability of the insulating layer and other layers. Also, since the distortion generated by internal stress that may be noise is reduced, detection sensitivity can be improved, which ultimately allows for more accurate measurement of shear force. Furthermore, advantageously, the effect can be applied to not only the conventional ground contact pressure distribution in the Z-axis direction but also the ground contact pressure distribution of the shear force. As a result, advantageously, pressure detection and shear force detection can be differentiated from each other. In addition, the fact that the insulating layer 30 has gradation indicates that the insulating layer 30 is not a uniform film of one layer but indicates that the insulating layer 30 may be a film configured such that physical properties or chemical properties change in a stepwise manner in a certain direction (in particular, the Z-axis direction), and the number of phases, the shading degree, or the like in such gradation is not particularly limited.

An example of a method for applying gradation to the insulating layer 30 with material density includes a method in which the insulating layer 30 is formed of a plurality of foamed layers to change concentration of the bubbles or a bubble size 300 in a stepwise manner. In other words, the insulating layer 30 is formed in a three-layer structure of, for example, foamed layers. A foaming agent is mixed into the respective layers with different proportions to a main material of the insulating layer 30. Alternatively, foaming agents, the foaming sizes of which are different from each other, are mixed into the respective layers of the insulating layer 30, dispersed, and heated, and thus the insulating layer is formed. Consequently, the insulating layer 30 formed of a three-layer foam having different bubble concentrations or the bubble size 300 is obtained (see FIG. 4).

In this case, the elastic modulus of the respective layers in the insulating layer 30 are different, and the effect of protecting the aforementioned first electrode 20 from breaking and deteriorating and the effect that the measurement value of shear force can be accurately measured are obtained. Meanwhile, the main materials of the respective layers in the insulating layer 30 are exactly the same, therefore, ply adhesion in the insulating layer 30 is high, and the durability of the insulating layer 30 can be advantageously improved. Another example of a method for applying gradation to the insulating layer 30 includes a method in which counterbore-shaped recesses and protrusions 70 are formed on the insulating layer 30 to control the density, hardness, elastic modulus, and shear strength of the material of the insulating layer (see FIG. 5). The insulating layer 30 is formed of a foam in advance or the counterbore-shaped recesses and protrusions 70 are formed in advance. In such a case, even when the shear force 60 is applied and in reaction to the shear force, the second electrode 40 or the protecting layer 50 is excessively bulged, bulging is absorbed by bubbles in the insulating layer 30 or the counterbore-shaped recesses and protrusions 70. This is effective in reduction of bulging.

In addition, the insulating layer 30 is preferably configured with a Poisson ratio in a range of 0 to 0.48. The Poisson ratio in an embodiment of the present disclosure is referred to as a value obtained by cutting the insulating layer 30 into the shape of a dumbbell No. 1 test piece, using a non-contact extensometer that can measure minute displacement, measuring longitudinal strain (the amount of change in the axial direction/original length in the axial direction) and lateral strain (the amount of change in the width direction/original length in the width direction) in the tensile testing method conforming to JIS K7127 and JIS K7161, and dividing the value of the lateral strain by the value of the longitudinal strain.

Tensile testing cannot be performed separately on the insulating layer 30, for example, when the insulating layer 30 is formed of, for example, of a very thin film or when the insulating layer 30 cannot be completely separated while integrally formed with the substrate 10 or the second electrode 40, In such a case, a value is measured in the same manner as described above with the condition that in a state where a laminate of the insulating layer 30 and the substrate 10 is provided or the second electrode 40 is placed on the insulating layer 30, 90% or more of the entire volume is occupied by the insulating layer 30. The measured value is defined as the value of the Poisson ratio value of the present disclosure.

When the Poisson ratio is less than 0, a location of the insulating layer 30, which is not pressed at the time of pressing the insulating layer 30 through the protecting layer 50 is also depressed, therefore, a significant detection error is likely to occur. Meanwhile, when the Poisson ratio exceeds 0.48, a location of the insulating layer 30, which is not pressed may be bulged, therefore, a significant detection error is likely to occur. An example of a method for lowering the Poisson ratio includes a method in which the counterbore-shaped recesses and protrusions 70 are formed on the surface of the insulating layer 30 and a portion of the protecting layer 50, which is bulged at the time of pressing, enters the recesses of the insulating layer 30, and thus the insulating layer 30 is prevented from being excessively bulged (see FIG. 5). The shape of the counterbore-shaped recesses and protrusions may be appropriately selected depending on the material and thickness of the insulating layer 30.

Examples of the material of the insulating layer 30 include a synthetic resin sheet, which has elasticity, of such as silicone, fluorine, urethane, epoxy, ethylene vinyl acetate copolymer, polyethylene, polypropylene, polystyrene, or butadiene rubber, a stretchable non-woven sheet, or the like. In particular, since an elastic sheet that is based on a silicone resin of silicone gel, silicone elastomer, or the like is excellent in durability in a wide temperature range from low to high temperatures and is excellent in elasticity, and thus the elastic sheet is more preferable. In addition, the insulating layer 30 is not limited to a sheet formed by a typical sheet molding method such as extrusion molding, and may be a coating layer formed by printing or with a coater or the like. The thickness is preferably selected in a range of 20 μm to 5 mm as appropriate.

Silicone gel is a material that mainly contains organo polysiloxane or the like and becomes gelled after being cured. The silicone gel has silicone specific properties such as durability and high safety and health, and properties such as flexibility, shock absorption, and moisture resistance that are derived from low cross-link density (the network structure formed of chain polymer molecules chemically bonded to each other, and having low density). The silicone gel mainly includes a room temperature curing type silicone gel and a heat curing type silicone gel, the curing speeds of which are different depending on the type and the increase or decrease of the adding amount of curing agent, the temperature adjustment, or the like. In addition, silicone hydrogel obtained by blending silicone into hydrophilic gel such as polyvinylpyrrolidone, polyvinyl chloride-based thermoplastic elastomer, or the like is also included in a type of the silicone gel of the present disclosure. Examples of a method for manufacturing the insulating layer 30 with silicone gel include a method in which a mixed raw material is prepared by adding a catalyst having a curing promoting effect and a silicone rubber material into a silicone gel material and the material is formed into a sheet with a variety of coaters such as a lip coater, a comma coater, a reverse coater, and a knife coater, and a method in which a silicone gel material is applied with a variety of coaters to a silicone rubber sheet prepared in advance and thereby is integrally molded with the silicone rubber sheet.

Silicone elastomer includes not only thermosetting silicone elastomer obtained by cross-linking a straight-chain silicone rubber composition or liquid silicone rubber with a vulcanizing agent or a catalyst, but also thermoplastic silicone-modified elastomer obtained by blending silicone oil into another elastomer such as urethane-based elastomer or obtained by copolymerization with reactive silicone oil. An example of a method for manufacturing the insulating layer 30 with silicone elastomer includes rolling forming in which a reinforcing agent or a vulcanizing agent is mixed in the aforementioned silicone raw material and is blended to be put into a rolling machine for providing a predetermined thickness and be formed in a sheet. Other examples of the method for manufacturing insulating layer include press molding in which a material is flowed into a predetermined mold and is vulcanized by applying heat and pressure, extrusion molding in which a material is put into an extruder to be formed in a sheet, calendaring molding in which a material is molded by a calendar roll into an wide elongated sheet, coating molding in which coating is applied with a coating device to a substrate such as a glass cloth, injection molding, winding molding with steam, and the like. Not only a catalyst but also a stabilizing agent may be mixed into such silicone resin based elastic sheets. Examples of the catalyst include nitrogen-containing compounds such as triethylamine and triethylenediamine, metallic salts such as potassium acetate, zinc stearate, and tin octylate, and an organic metal compound such as dibutyltin dilaurate. Examples of the stabilizing agent include a stabilizing agent such as substituted benzotriazole for UV radiation, and a stabilizing agent such as phenol derivatives for thermal oxidation.

Further, an example of a configuration in which the insulating layer 30 is formed of a foam includes an insulating layer that is molded in a foam or a porous shape by finely dispersing gas in the synthetic resin of the insulating layer 30. In particular, a sheet formed only of polyethylene, polypropylene, polystyrene, or the like has low elasticity, and in the meantime, is formed of a foam, and thus elasticity is generated. Therefore, when these synthetic resins are selected as the material of the insulating layer 30, the insulating layer is preferably remained in the state of a foam, Examples of a method for manufacturing the foam include manufacturing methods by molding methods such as beads foaming in which a thermally expandable microcapsule foaming agent obtained by enclosing a thermally decomposable foaming agent such as azodicarbonamide or hydrogen carbonate, fluorocarbons, hydrocarbon, or the like in a thermoplastic resin capsule is dispersed into the aforementioned synthetic rein, and thus heat is applied, batch foaming, pressing foaming, secondary foaming under atmospheric pressure, injection foaming, extrusion foaming, and foam-blowing.

The bubble size 300 is preferably 2 μm to 100 μm. In the method for manufacturing the foam for obtaining such a bubble size, atmosphere pressure (external pressure) is preferably controlled by depressurizing or pressurizing to a fixed pressure in a reaction process of vulcanization foaming. This is because the pressure is controlled in such a range and thus the growth of bubbles can be promoted or disturbed during vulcanization foaming and the foam having a certain desired foaming ratio and a constant cell size can be obtained. This is also because the range of a foaming ratio can be greatly increased and a product having a desired foaming ratio can be obtained. Of foams, a silicone foam of a material formed of a silicone-based resin is preferable. There is a merit that an elastic change of the silicone foam, which is due to temperatures is small and the silicone foam can be used in measurement at low temperatures. In addition, the silicone foam has high durability; therefore, even when distortion and stress due to large displacement are repeatedly applied, breaking and deformation can be prevented. As a result, this can be used in a device for measuring ground contact conditions in any field, for example, in measuring a product such as a tire having a large load or in measuring a product such as a shoe sole or the like having a small load.

The silicone foam is a foam obtained by foaming silicone rubber independently or semi-independently. The silicone foam may include, for example, a type in which a foaming agent is added into silicone rubber and heated to be foamed as described above, a self-foaming reaction type formed of a two-component liquid silicone, or the like. Examples of a method for manufacturing the insulating layer 30 with a self-foaming reaction type silicone foam include a calendar molding method in which a liquid silicone rubber raw material is sandwiched by two carrier sheets to be passed through between calendar rolls and formed into a sheeting shape and then is foamed by vulcanization, a free-foaming method in which a liquid silicone rubber raw material is charged on a sheet or the like without restriction to be foamed by vulcanization, a cast molding method in which a silicone liquid raw material is poured into a mold to be foamed by vulcanization, and the like.

Furthermore, the insulating layer 30 may be formed of electrorheological fluid. The electrorheological fluid is a fluid having viscoelastic properties that reversibly change by application or removal of an electric field. Examples of the electrorheological fluid include uniform electrorheological fluid made of a single substance such as liquid crystal, dispersed electrorheological fluid obtained by dispersing particles in an insulating liquid, and the like. In particular, in the case of the dispersed electrorheological fluid, the solid-liquid phase transition is possible with the presence or absence of an electric field, and thus the dispersed electrorheological fluid is more preferable. An example of particles used in the dispersed electrorheological fluid formed of porous microparticles made of carbonaceous or insulating substances. The average particle size of the microparticles is preferably 5 to 30 µm. An example of the insulating liquid used in the dispersed electrorheological fluid includes silicone oil or the like. Further, by adding a cross-linking agent, a platinum catalyst, or the like into the insulating liquid and applying heat processing thereto, the electrorheological fluid may be turned into a gel. In a sheet of the gelled electrorheological fluid, by applying an electric field, the particles move into the gel and the surface state changes. In other words, the gel is bulged by electric force of the interface. Accordingly, the surface becomes a smooth surface only of the gel and is brought into contact with entire surfaces of the other layers, therefore being in a state of exhibiting adsorption. When such a state is generated, shear stress is easily transmitted to the insulating layer 30, and thus detection sensitivity is improved. A method for manufacturing the dispersed electrorheological fluid includes a method in which by adding and blending dried porous particles into electrorheological fluid in a state where the dried porous particles are maintained at a temperature equal to or higher than a decomposition temperature of the electrorheological fluid, the electrorheological fluid present near the porous particles is decomposed to generate low-molecular-weight organic compounds and the organic compounds are uniformly absorbed on the surface of the porous particles.

Figure 5:
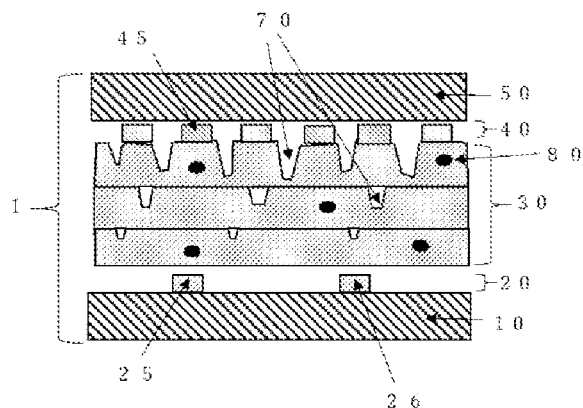
FIG. 5 is a cross-sectional view illustrating an embodiment in which, in the insulating layer of the electrostatic capacitance detection device according to an embodiment of the present disclosure, counterbore-shaped recesses and protrusions are formed in the insulating layer and thus the insulating layer has gradation.

In addition, conductive particles 80 such as carbon black, gold, silver, or nickel may be added into the insulating layer 30 in a proportion range that can maintain insulating properties (see FIG. 5). This is because when the insulating layer 30 is pressed, the distance between the contained conductive particles is reduced to suddenly increase an electrostatic capacitance value between the first electrode 20 and the second electrode 40, and thus the effect of increase in sensitivity of pressure and shear force by a calculation method for the shear force 60, which will be described below, is attained. The average particle size of the conductive particles 80 is preferably one-tenth or less of the thickness of the insulating layer 30.

Next, the first electrode 20 and the second electrode 40 will be described. Examples of a material of the first electrode 20 and the second electrode 40 include not only a metal film of gold, silver, copper, platinum, palladium, aluminum, rhodium, or the like, but also a conductive paste film obtained by dispersing metal particles of these materials in a resin binder, or an organic semiconductor of polyhexylthiophene, polydioctylfluoren, pentacene, tetrabenzoporphyrin, or the like, but is not particularly limited thereto. An example of a forming method in the former case includes a method in which the entire surface of a conductive film is formed by a plating method, a sputtering method, a vacuum deposition method, an ion plating method, or the like and is thereafter patterned by etching. An example of a forming method in the latter case includes a method in which the surface is directly patterned by a printing method or the like such as screen printing, gravure printing, or offset printing.

The first electrode 20 may be formed on the substrate 10 located below the insulating layer 30 (see FIGS. 1 to 5). Examples of the substrate 10 include a glass epoxy substrate, a polyimide substrate, a polybutylene terephthalate resin substrate, and the like, but the substrate 10 is not particularly limited thereto. Preferably, the thickness is selected as a value approximately from 0.1 mm to 3 mm as appropriate. The second electrode 40 may be formed mainly above the insulating layer 30, and may be formed of only one layer or may be formed of two layers 401 and 402 (see FIG. 1) or multi layers more than two. The pattern of the second electrode 40 may have any shape such as a round shape, an angular shape, or a linear shape. Preferably, the thickness of the second electrode 40 is selected in a range of 0.1 µm to 100 µm as appropriate.

Figure 6:
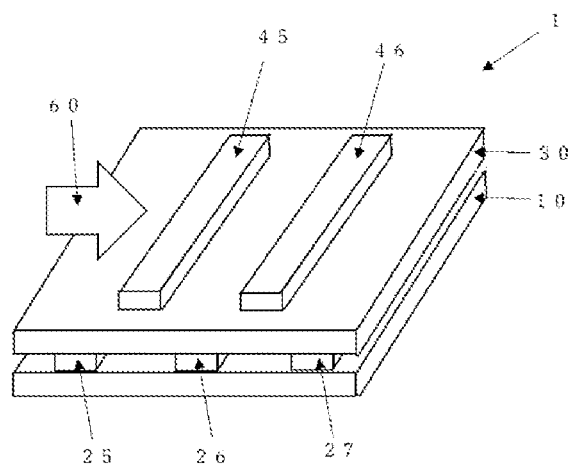
FIG. 6 is a schematic diagram illustrating an embodiment in which, in a first electrode and a second electrode of the electrostatic capacitance detection device according to an embodiment of the present disclosure, the first electrode and the second electrode have linear patterns extending in the same direction in a plan view.

The patterns of the first electrode 20 and the second electrode 40 include linear patterns, and an example thereof includes patterns extending in the same direction in a plan view (see FIG. 6). By configuring the first electrode 20 and the second electrode 40 so as to have the linear patterns extending in the same direction, when the shear force 60 is applied from an angle direction intersecting with one direction in which the linear pattern of the second electrode extends, the second electrode 40 is deformed in accordance with the magnitude of the shear force 60, and the distance between the second electrode 40 and the first electrode 20 is changed. Accordingly, an electrical signal when the electrostatic capacitance value between the second electrode 40 and the first electrode 20 changes is detected, and thus the magnitude of the force can be measured.

Figure 7:
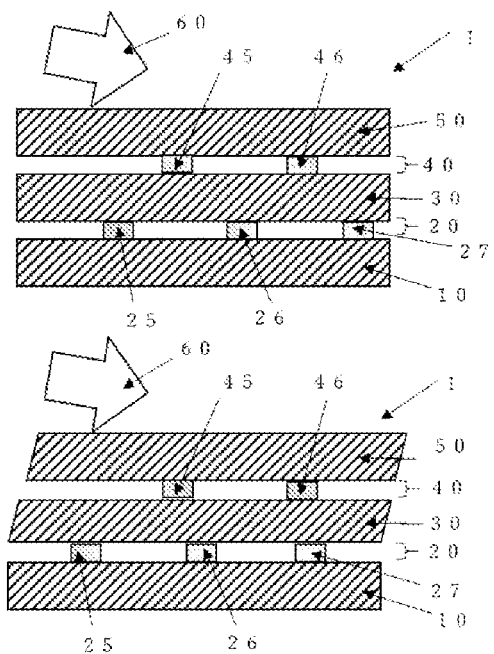
FIG. 7 is a detailed view illustrating an embodiment in which, in the first electrode and the second electrode of the electrostatic capacitance detection device according to an embodiment of the present disclosure, the first electrode and the second electrode have linear patterns extending in the same direction in a plan view, and the detailed view illustrating a case in which the first electrode is in the linear pattern of three linear patterns and the second electrode is in the linear pattern of two linear patterns.

For example, the first electrode 20 has linear patterns 25, 26 and 27 extending in one direction, and the second electrode 40 has linear patterns 45 and 46 extending in the same direction as the first electrode 20. The linear patterns 45 and 46 are formed to be located respectively in a gap between the pattern 25 and the pattern 26 and a gap between the pattern 26 and the pattern 27 (see FIG. 6). When the shear force 60 is applied along the surface of the protecting layer 50 on the top surface of the electrostatic capacitance detection device 1 from an angle direction intersecting with one direction in which the linear patterns 45 and 46 of the second electrode 40 extend, the linear patterns 45 and 46 of the second electrode 40 are deformed together with the protecting layer 50 and the insulating layer 30 toward the right direction on the plane of paper, in a direction in which the shear force 60 is applied (parallel displacement) in accordance with the magnitude of the shear force 60. The distance between the linear pattern 45 and the linear pattern 26 of the first electrode 20 is reduced and the distance between the linear pattern 46 and the linear pattern 26 of the first electrode 20 is increased. In addition, the distance between the linear pattern 25 of the first electrode 20 and the linear pattern 45 is increased, and the distance between the linear pattern 27 of the first electrode 20 and the linear pattern 46 is reduced (see FIG. 7). The change of the distance between the linear patterns across the layers is proportional to the magnitude of the shear force 60. Therefore, the magnitude of the shear force 60 can be detected by detecting a change of the electrostatic capacitance between each of the linear patterns due to the change of the distance between the linear patterns across the layers.

Figure 8:
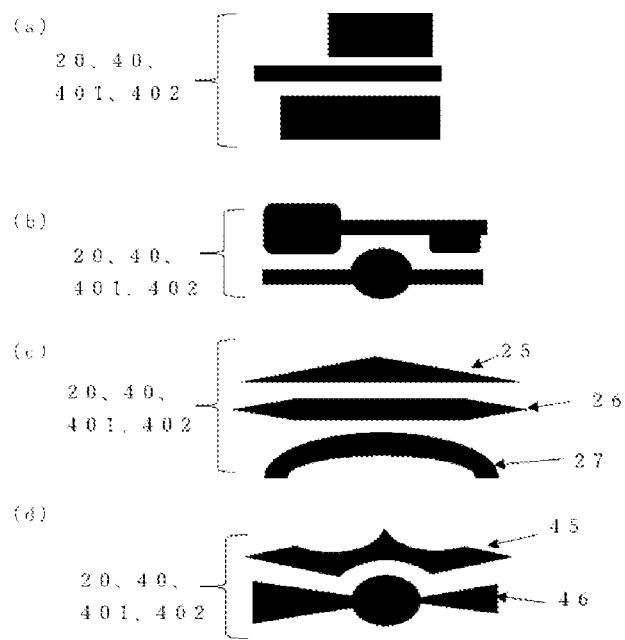
FIG. 8 is a schematic plan view illustrating a specific example of the linear patterns of the first electrode and the second electrode in the first electrode and the second electrode of the electrostatic capacitance detection device according to an embodiment of the present disclosure.

Although a case in which the first electrode 20 has three linear patterns and the second electrode 40 has two linear patterns are described in this example, only one linear pattern or four or more linear patterns may be applied. Further, the number of linear patterns of the first electrode 20 may be identical to the number of linear patterns of the second electrode 40. Furthermore, this example describes a case in which the linear patterns of the first electrode 20 and the second electrode 40 have substantially the same shape, elongated rectangular shape. Alternatively, the linear patterns may have widths and lengths different from each other (see FIG. 8(a)) or may be formed to be partially wide or narrow (see FIG. 8(b)). In addition, the shape of the linear pattern may be not only a rectangular shape but also a polygonal shape or a curved shape such as a circular arc shape (see FIG. 8(c)). Alternatively, the shape of the linear pattern may be a composite shape of the shapes above or may be a wave shape (see FIG. 8(d)). Note that the square and circular shapes or the like as just described generally do not fall within the category of a linear pattern, however, in an embodiment of the present disclosure, in a case where the square and circular shapes are configured to have actions or functions of the present disclosure, the square and circular shapes are regarded as a type of linear pattern and within the scope of the present disclosure.

Further, each of the first electrode 20 and the second electrode 40 may be formed of a plurality of layers. For example, the first electrode 20 may be formed in a two-layer structure of a lower first electrode 21 and an upper first electrode 22 with an insulating film interposed therebetween, and the second electrode 40 may be formed in a two-layer structure of a lower second electrode 41 and an upper second electrode 42 with an insulating film interposed therebetween (see FIG. 9-1). In this case, the first electrode 20 preferably includes the lower first electrode 21 of linear patterns extending in the X direction, and the upper first electrode 22 of linear patterns extending in the Y direction (see FIG. 9-2(a)). The second electrode 40 preferably includes the lower second electrode 41 of linear patterns extending in the same X direction as the lower first electrode 21, and the upper second electrode 42 of linear patterns extending in the same Y direction as the upper first electrode 22 (see FIG. 9-2 (b)).

Figures 1, 9:
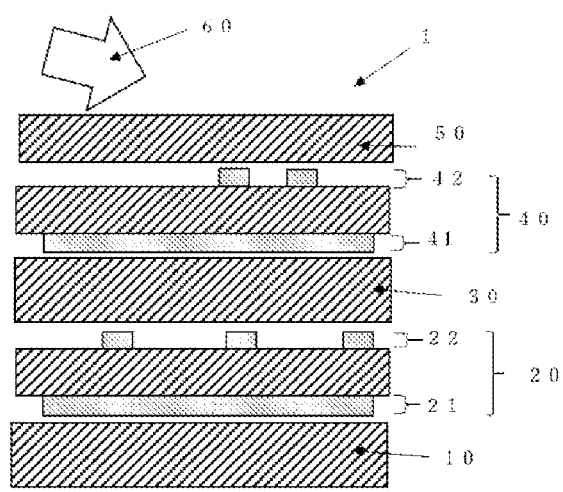
Figures 2, 9:
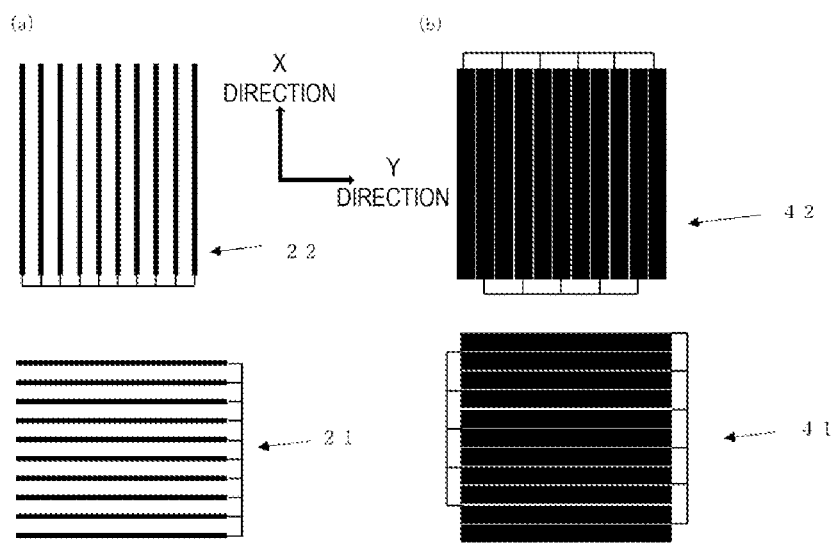

Additionally, FIG. 9-1 illustrates an example in which the two layers of the second electrode 40 are formed above the two layers of the first electrode 20. Alternatively, each of the layers of the first electrode and each of the layers of the second electrode may be formed alternately with each other. In other words, the lower second electrode 41 may be formed above the lower first electrode 21, the upper first electrode 22 may be formed above the lower second electrode 41, and the upper second electrode 42 may be formed above the upper first electrode 22. In any of these cases, the lower first electrode 21 can be covered by the lower second electrode 41 having a large cross-section area, and the upper first electrode 22 can be covered by the upper second electrode 42 having a large cross-section area. Therefore, advantageously, the circuit patterns of the lower first electrode 21 and the upper first electrode 22 located inside can be unrecognized from the outside. Moreover, when there is no need to cover, the cross-section area of each of the electrodes may be the same. Conversely, the cross-section area of the electrodes of the two layers located inside may be larger.

Figure 2:
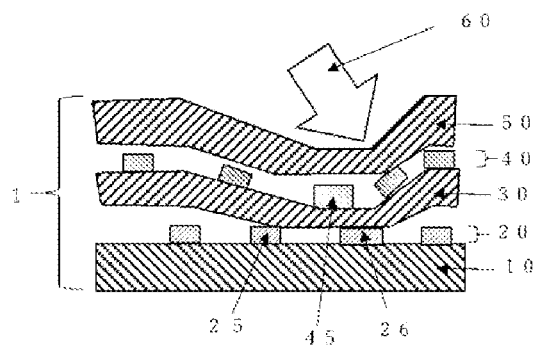
FIG. 2 is a cross-sectional view illustrating an embodiment in which shear force is applied obliquely from the upper portion of a main detection unit of the electrostatic capacitance detection device according to an embodiment of the present disclosure, and a portion of the main detection unit of the electrostatic capacitance detection device is deformed.

With such a configuration, a change of the electrostatic capacitance value between the lower first electrode 21 and the lower second electrode 41 and a change of the electrostatic capacitance value between the upper first electrode 22 and the upper second electrode 42 can be detected separately. Alternatively, a change of the electrostatic capacitance value between the lower first electrode 21 and the upper second electrode 42 and a change of the electrostatic capacitance value between the upper first electrode 22 and the lower second electrode 41 can be detected separately. As a result, even when the shear force 60 is applied in an oblique direction even as viewed from the plane and even when the shear force 60 has a component force 65 in the X direction and a component force 66 in the Y direction (in a case where the direction of the shear force 60 is not parallel or orthogonal to the direction of the linear pattern of either the upper first electrode 41 or the upper second electrode 42), the respective component forces 65 and 66 in the X direction and the Y direction of the shear force 60 can be advantageously measured. Further, FIG. 9-2 illustrates an example in which each electrode has a linear pattern in the same direction as either the X direction or the Y direction. Alternatively, even in a case where the linear pattern is not in the same direction as either the X direction or the Y direction, the advantage as just described can be attained, therefore, the scope of the present disclosure is not limited to the linear pattern in the same direction as either the X direction or the Y direction.

Figure 10:
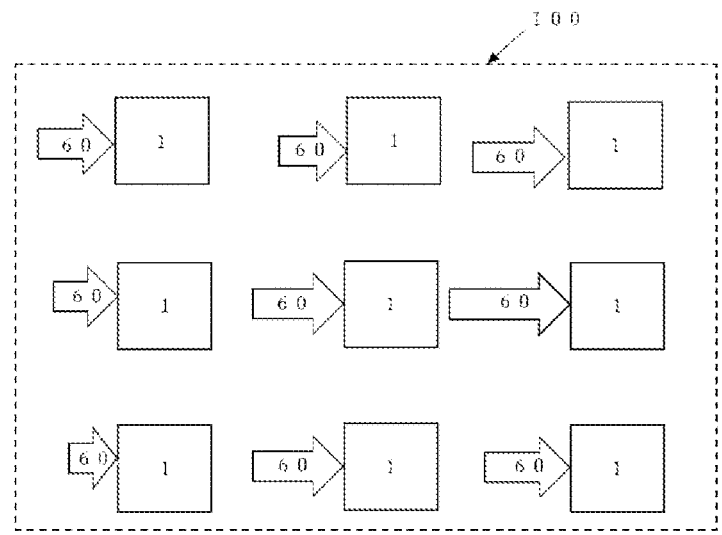
FIG. 10 is a schematic diagram illustrating an example in which a plurality of the electrostatic capacitance detection devices according to an embodiment of the present disclosure is arranged vertically and horizontally in a matrix to form an electrostatic capacitance detection device group.

Furthermore, when an electrostatic capacitance detection device group 100 is configured in which a plurality of the electrostatic capacitance detection devices 1 according to the present disclosure is arranged longitudinally and horizontally in a matrix, the planar distribution of the shear force 60 in an angle direction intersecting with one direction of each of the electrostatic capacitance detection devices 1 can be measured (see FIG. 10). In other words, each of the electrostatic capacitance detection devices 1 can measure force in the angle direction intersecting with the electrostatic capacitance detection device 1 at each of the positions thereof. Therefore, even in a case where the magnitude of the shear force 60 differs depending on the location, by arranging a plurality of the electrostatic capacitance detection devices 1 longitudinally and horizontally in a matrix, the magnitude of the shear force 60 at each location can be measured.

Figure 11:
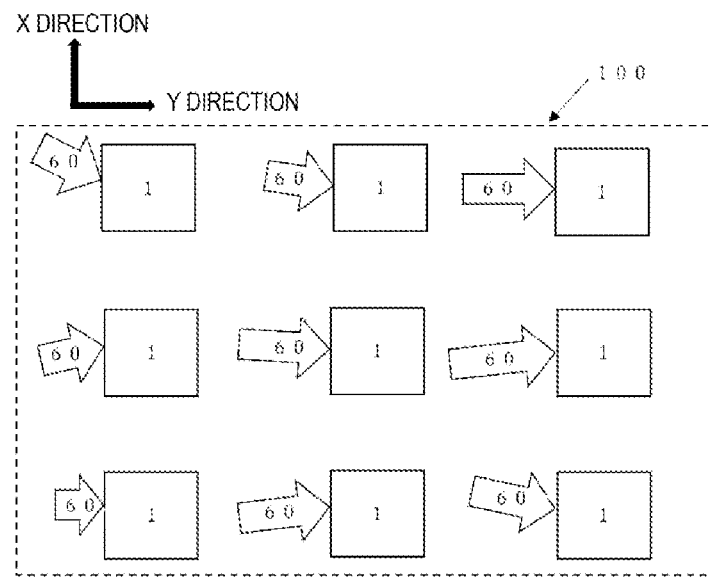
FIG. 11 is a schematic diagram illustrating an example in which a plurality of the electrostatic capacitance detection devices according to an embodiment of the present disclosure in which each of the second electrode and the first electrode is formed in a plurality of layers is arranged vertically and horizontally in a matrix to form an electrostatic capacitance detection device group.

Furthermore, a plurality of layers of the second electrodes 40 and a plurality of layers of the first electrodes 20 are formed in the electrostatic capacitance detection device 1 according to the present disclosure, and a plurality of the electrostatic capacitance detection devices 1 is arranged longitudinally and horizontally in a matrix to form the electrostatic capacitance detection device group 100. In such a case, the respective component forces 65 and 66 in the X direction and the Y direction of the shear force 60 of each of the electrostatic capacitance detection devices 1 can be measured. In addition, the planar distribution of the respective component forces 65 and 66 in the X direction and the Y direction of the shear force 60 can also be measured (see FIG. 11). In other words, each of the electrostatic capacitance detection devices 1 can measure each component force (the component force in the X direction and the component force in the Y direction) in the angle direction intersecting with the electrostatic capacitance detection device 1 at each location. Therefore, even in a case where the magnitude and direction of the shear force 60 differ depending on the location, by arranging a plurality of the electrostatic capacitance detection devices 1 longitudinally and horizontally in a matrix, the magnitude of the component forces (the component force 65 in the X direction and the component force 66 in the Y direction) of the shear force 60 at each location can be measured.

In addition, in a case where the electrostatic capacitance detection devices 1 are arranged longitudinally and horizontally in a matrix is described in the aforementioned example. Alternatively, the electrostatic capacitance detection devices 1 may be arranged longitudinally in a row or horizontally in a row. Further, the electrostatic capacitance detection device group 100 may include the electrostatic capacitance detection devices 1 each configured such that, for example, all of the substrate 10 and the insulating layer 30 are applied as common components and only the second electrode 40 and the first electrode 20 are formed as separate components. Alternatively, the electrostatic capacitance detection device group 100 may be configured such that the electrostatic capacitance detection devices 1 already manufactured are adhered one by one to another large substrate to be arranged thereon.

Figures 1, 12:
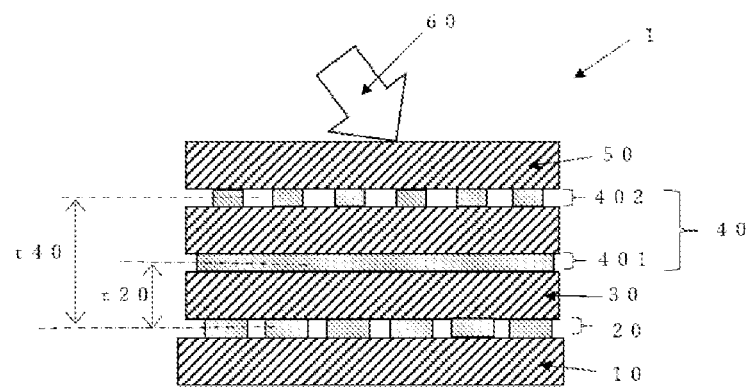
Figures 2, 12:
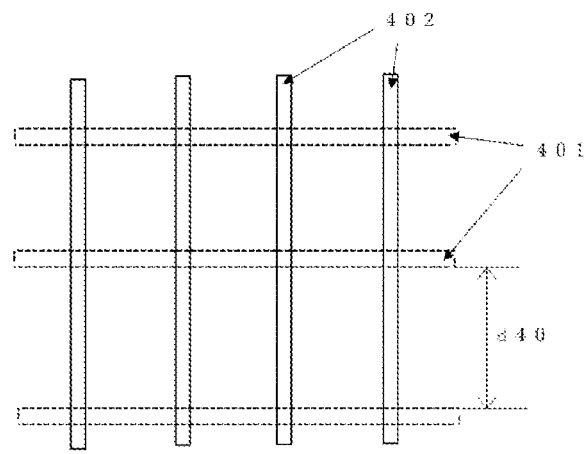
Figures 3, 12:
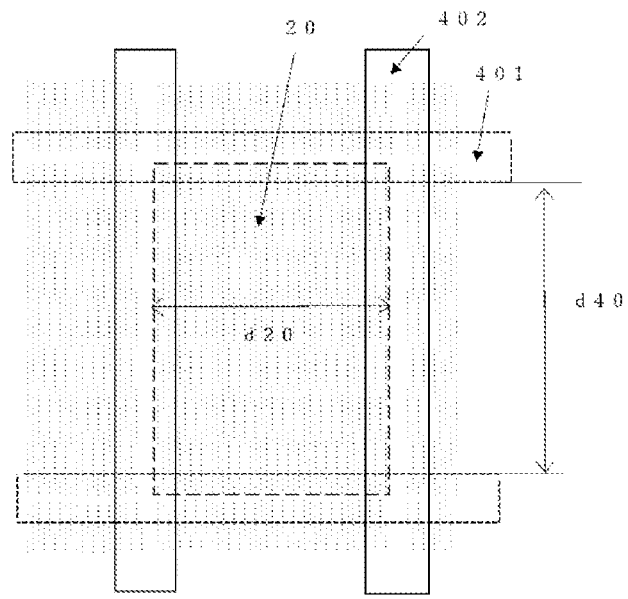
Figures 4, 12:
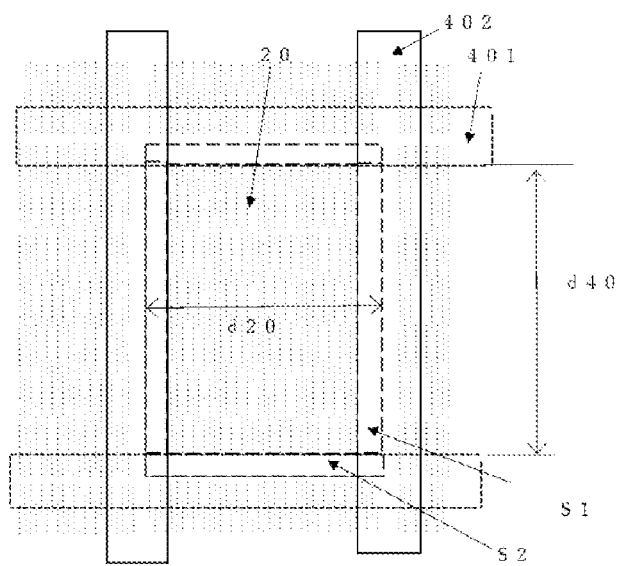
Figures 5, 12:
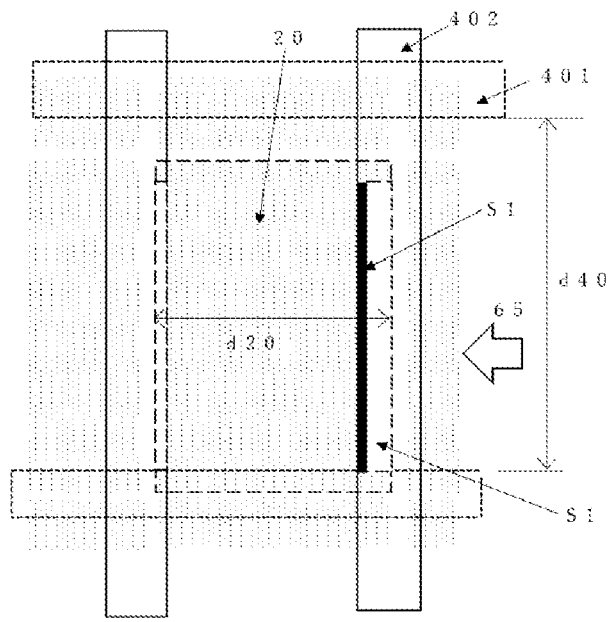
Figures 6, 12:
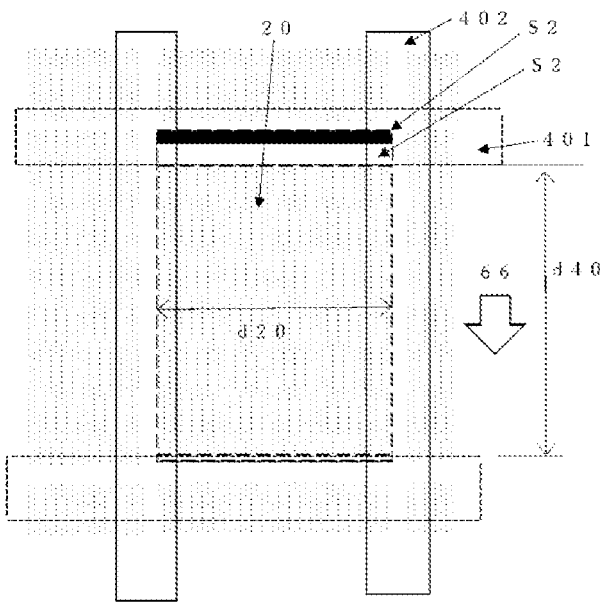
Figure 13:
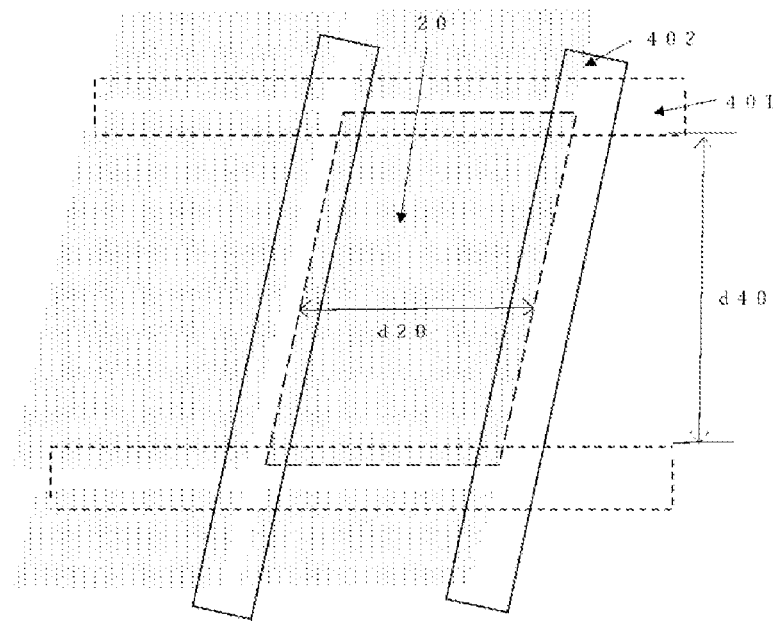
FIG. 13 is a plan view illustrating a case in which the first electrode has an island-shaped pattern having a parallelogram shape, and the second electrode includes two layers of the upper electrode and the lower electrode that are formed of a plurality of linear patterns of the upper electrodes and the lower electrodes intersect with one another, in the electrostatic capacitance detection device according to an embodiment of the present disclosure.

Furthermore, in other aspect, the first electrode 20 is formed of an island-shaped pattern, the second electrode 40 is formed of two layers of an upper second electrode 402 and a lower second electrode 401 (see FIG. 12-1), the upper second electrode 402 and the lower second electrode 401 have a plurality of linear patterns intersecting in a plan view (see FIG. 12-2), and a portion of the island-shaped pattern of the first electrode 20 is a pattern overlapping with a portion of the pattern of the upper second electrode 402 and a portion of the pattern of the lower second electrode 401 in a plan view (see FIG. 12-3). In this plan view, the intersecting angle between the upper second electrode 402 and the lower second electrode 401 is not limited. In a case where the upper second electrode 402 and the lower second electrode 401 are orthogonal to each other (that is, the intersecting angle is 90°), the pattern of the first electrode 20 is a rectangular grid shape (see FIG. 12-3), and when the upper second electrode 402 and the lower second electrode 401 is not orthogonal to each other, the pattern of the first electrode 20 is a parallelogram-shaped grid pattern (see FIG. 13).

In any of these cases, in a plan view, the area of an overlapping region (hereinafter denoted by S1) of a portion of the island-shaped pattern of the first electrode 20 with a portion of the pattern of the upper second electrode 402 is preferably larger than the area of an overlapping region (hereinafter denoted by S2) of a portion of the island-shaped pattern of the first electrode 20 with a portion of the pattern of the lower second electrode 401. The electrostatic capacitance value between the electrodes is inversely proportional to the distance between the electrodes. Accordingly, the distance between the first electrode 20 and the upper second electrode 402 is longer than the distance between the first electrode 20 and the lower second electrode 401, and thus the detection sensitivity of the electrostatic capacitance value between the first electrode 20 and the upper second electrode 402 is low. Therefore, by setting S1 to be larger than S2 in a plan view to compensate for the low sensitivity, the sensitivity between the first electrode 20 and the upper second electrode 402 is improved, and the sensitivity between the first electrode 20 and the upper second electrode 402 can be approximately equal to the sensitivity between the first electrode 20 and the lower second electrode 401. Consequently, the detection sensitivity in the X direction and the detection sensitivity in the Y direction of the shear force 60 can be approximately equal.

Figure 14:
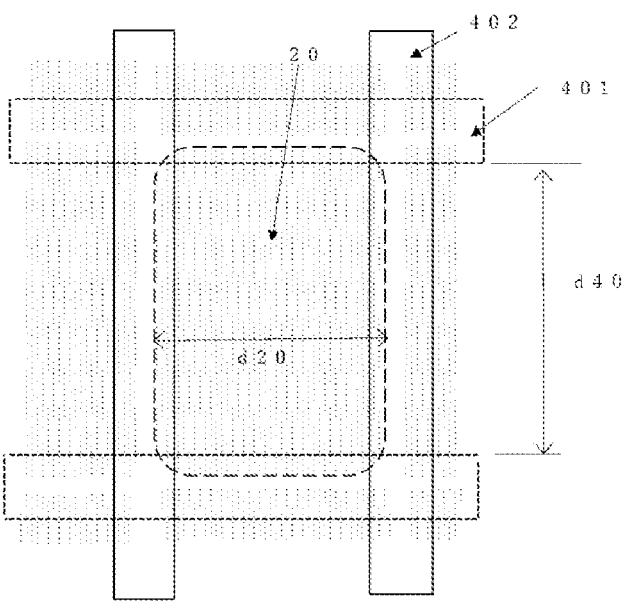
FIG. 14 is a plan view illustrating a case in which the first electrode has an island-shaped pattern having a shape in which four corners of a rectangle are rounded to eliminate four apexes, and the second electrode includes two layers of the upper electrode and the lower electrode that are formed of a plurality of linear patterns of the upper electrodes and the lower electrodes intersect with one another, in the electrostatic capacitance detection device according to an embodiment of the present disclosure.
Figures 1, 15:
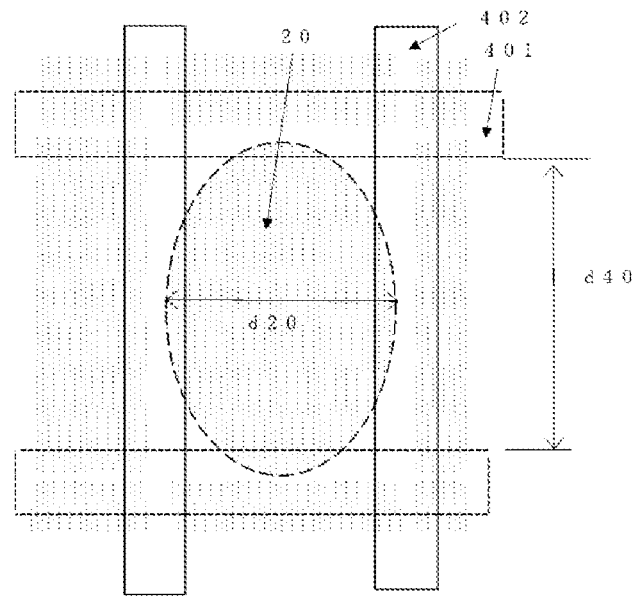
Figures 2, 15:
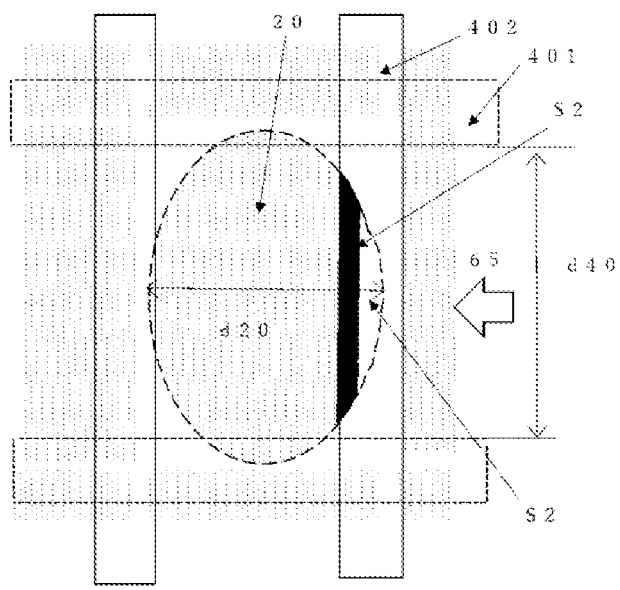

Note that, in a case where the upper second electrode 402 and the lower second electrode 401 are orthogonal in a plan view, the pattern of the first electrode 20 may be formed not in a rectangular shape but in a shape in which four corners of a rectangle are rounded to exclude four apexes (see FIG. 14). Likewise, in a case where the upper second electrode 402 and the lower second electrode 401 are not orthogonal in a plan view, the pattern of the first electrode 20 may be formed not in a parallelogram but in a pattern shape in which four corners of a parallelogram are rounded to exclude four apexes. In addition, in a case where the upper second electrode 402 and the lower second electrode 401 are orthogonal in a plan view, the pattern of the first electrode 20 may be a vertically elongated oval shape rather than a rectangular shape (see FIGS. 15-1 and 15-2). In this case, since the regions S1 and S2 are separated from each other compared with a case where the first electrode is formed in a rectangular shape, adverse effects due to noise or the like of an electrical signal generated at each of the electrodes are reduced. Further, a ratio of an increased region of S1 (hereinafter referred to as S1'), which is caused by parallel displacement of the upper second electrode 402 from right to left on the plane of paper due to a shear force 60 applied from right to left on the plane of paper (that is, a (S1+S1')/S1 ratio) is greater than that in an example of a rectangular or parallelogram pattern. Therefore, the oval shape is highly advantageous in the increase of detection sensitivity against noise compared with the rectangular or parallelogram pattern. Likewise, a ratio of an increased region of S2 (hereinafter referred to as S2'), which is caused by parallel displacement of the lower second electrode 401 from top to bottom on the plane of paper due to a shear force 60 applied from top to bottom on the plane of paper (that is, a (S2+S2')/S2 ratio) is greater than that in an example of a rectangular or parallelogram pattern. Therefore, the oval shape is highly advantageous in the increase of detection sensitivity against noise compared with the rectangular or parallelogram pattern.

Furthermore, the pattern may be formed in an intermediate pattern between a shape in which four corners are rounded to exclude four apexes and an oval shape. Note that the island-shaped pattern of the first electrode 20 may be formed by aligning a plurality of patterns that are exactly identical or may be formed by combining the various patterns described above and aligning a plurality of those patterns. In any of the aforementioned drawings, the linear patterns of the upper second electrode 402 and the lower second electrode 401 are both described as elongated rectangles having substantially the same shape. Alternatively, the pattern may have the widths and lengths thereof being different from each other (see FIG. 8(a)) or being partially widened or narrowed in width (see FIG. 8(b)). Moreover, the linear patterns of the upper second electrode 402 and the lower second electrode 401 may be partially or entirely formed in a polygonal shape or a circular arc shape (see FIG. 8(c)) or may be formed in a composite pattern of the polygonal shape and the circular arc shape or in a wave shape (see FIG. 8(d)). The island-shaped pattern of the first electrode 20 may also be changed as appropriate in accordance with the linear patterns of the upper second electrode 402 and the lower second electrode 401 that are located above the first electrode.

Various examples of the island-shaped pattern of the first electrode 20 and the linear patterns of the upper second electrode 402 and the lower second electrode 401 of the second electrode 40 are illustrated as above. Meanwhile, an example in which the island-shaped pattern of the first electrode 20 is a slightly vertically long rectangle and the linear patterns of the upper second electrode 402 and the lower second electrode 401 are formed in a linear rectangle shape will be focused and described below in detail (see FIGS. 12-4 to 12-6). In this case, a distance d40 in the pattern direction of the upper second electrode 402, which is a near distance between intersection end portions in which the upper second electrode 402 and the lower second electrode 401 intersect in a plan view is preferably equal to or greater than a distance d20 in the pattern direction of the lower second electrode 401, which is a center-to-center distance between intersection points in which the upper second electrode 402 and the lower second electrode 401 intersect in a plan view. In addition, the first electrode 20 having the island-shaped pattern is preferably configured such that each of the apexes of the rectangular is in a region where the upper second electrode 402 and the lower second electrode 401 intersect in a plan view (see FIG. 12-4).

By measuring a change of an electrostatic capacitance value between the first electrode 20 having the island-shaped pattern and the upper second electrode 402 and a change of an electrostatic capacitance value between the first electrode 20 having the island-shaped pattern and the lower second electrode 401, the component force 65 in the X-axis direction of the shear force 60 in the pattern direction of the upper second electrode 402 and the component force 66 in the Y-axis direction of the shear force 60 in the pattern direction of the lower second electrode 401 can be measured. The region where the electrostatic capacitance value between the first electrode 20 having the island-shaped pattern and the upper second electrode 402 can be measured is S1, that is, a white-fill portion in FIG. 12-4. Meanwhile, the region where the electrostatic capacitance value between the first electrode 20 having the island-shaped pattern and the lower second electrode 401 can be measured is S2, that is, a gray-fill portion in FIG. 12-4. Note that an average distance t40 in the thickness direction between the first electrode 20 having the island-shaped pattern and the upper second electrode 402 is larger than an average distance t20 in the thickness direction between the first electrode 20 having the island-shaped pattern and the lower second electrode 401 (that is, the distance from the lower second electrode 401 to the first electrode 20 having the island-shaped pattern is shorter than the distance from the upper second electrode 402 to the first electrode 20 having the island-shaped pattern). Therefore, an overlapping region of three electrodes of the first electrode 20, the upper second electrode 402, and the lower second electrode 401 is superior in function as S2 (the gray-fill portion) (see FIG. 12-4).

Figure 4:
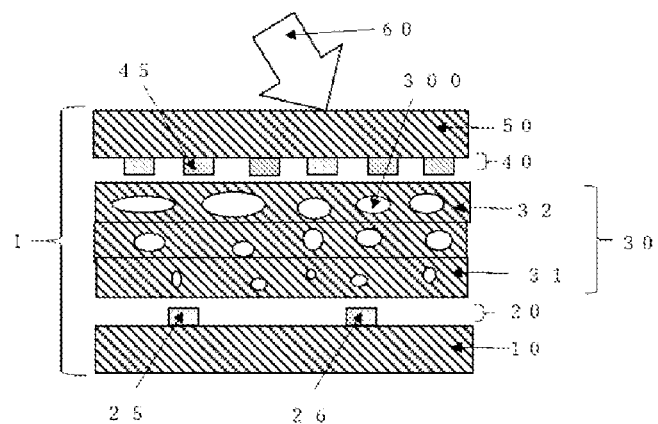
FIG. 4 is a cross-sectional view illustrating an embodiment in which, in the insulating layer of the electrostatic capacitance detection device according to an embodiment of the present disclosure, the insulating layer is formed of a plurality of foamed layers and has gradation.

In such a state, when the component force 65 in the X-axis direction is applied from right to left on the plane of paper, the upper second electrode 402 of FIG. 12-4 is moved parallel to the position of the upper second electrode 402 of FIG. 12-5 (that is, moved parallel toward the left on the plane of paper) in proportion to the magnitude of the force. As a result, the region S1 where the electrostatic capacitance value between the first electrode 20 and the upper second electrode 402 can be measured increases from the state of FIG. 12-4 by the area of the black-fill region S1' in the state of FIG. 12-5. Therefore, by detecting the increased electrostatic capacitance value of the black-fill region S1' in FIG. 12-5, the original component force 65 in the X-axis direction can be measured. Likewise, in the state of FIG. 12-4, when the component force 66 in the Y-axis direction is applied from top to bottom on the plane of paper, the lower second electrode 401 of FIG. 12-4 is moved parallel to the position of the lower second electrode 401 of FIG. 12-6 (that is, downwardly moved parallel on the plane of paper) in proportion to the magnitude of the force. As a result, the region S2 where the electrostatic capacitance value between the first electrode 20 and the lower second electrode 401 can be measured increases from the state of FIG. 12-4 by the area of the black-fill region S1' in the state of FIG. 12-6. Therefore, by detecting the increased electrostatic capacitance value of the black-fill region S1' in FIG. 12-6, the original component force 66 in the Y-axis direction can be measured.

The detection sensitivity of the change of the electrostatic capacitance value with the component force 65 in the X-axis direction of the shear force 60 is preferably set substantially equal to the detection sensitivity of the change of the electrostatic capacitance value with the component force 66 in the Y-axis direction of the shear force 60. Therefore, the area of the black-fill region S in FIG. 12-5 is preferably larger than the area of the black-fill region S2' in FIG. 12-6. In other words, this is because the distance from the upper second electrode 402 to the first electrode 20 is longer than the distance from the lower second electrode 401 to the first electrode 20 (see FIG. 12-1) and therefore, when the area of S1' is equal to the area of S2', the detection sensitivity at the upper second electrode 402 is generally lower than the detection sensitivity at the lower second electrode 401. Specifically, designing is preferably made such that a relationship of t20/t40 (the distance between the first electrode 20 and the lower second electrode 401/the distance between the first electrode 20 and the upper second electrode 402) ≈S2'/S1' (the area of the black-fill region in FIG. 12-6/the area of the black-fill region in FIG. 12-5) is established. Therefore, the area of S2' and the area of S1' may be the same under the condition that the difference between t20 and t40 is small and negligible, for example, as in a case where t20 and t40 may be considered identical.

Next, wiring of the first electrode 20 and the second electrode 40 to the processing unit 120 will be described in detail. A wiring pattern may be connected from each of the electrodes of the first electrode 20 and electrically connected via an individual AC drive circuit 5 and a drive circuit 110 to the processing unit 120. Meanwhile, the second electrode 40 may be electrically connected via a signal conversion unit 130 to the processing unit 120 (see FIGS. 1 and 16). As just described, each of the electrodes of the first electrode 20 having a complex and fine pattern is electrically connected to the processing unit via the individual AC drive circuit 5 likewise having a complex and fine pattern, and thus a change of the electrostatic capacitance value generated between the first electrode 20 and the second electrode 40 can be detected highly accurately in every very fine range. Consequently, the shear force 60 applied from above the second electrode 40 or the protecting layer 50 can be measured very accurately. Note that the first electrode 20 and the second electrode 40 may be replaced. In other words, the second electrode 40 may be formed on the substrate 10, and the first electrode 20 may be formed on the insulating layer 30. In addition, the first electrode 20 at the upper side may be connected to the individual AC drive circuit 5 while the first electrode 20 at the lower side may be connected to the signal conversion unit 130.

Figure 16:
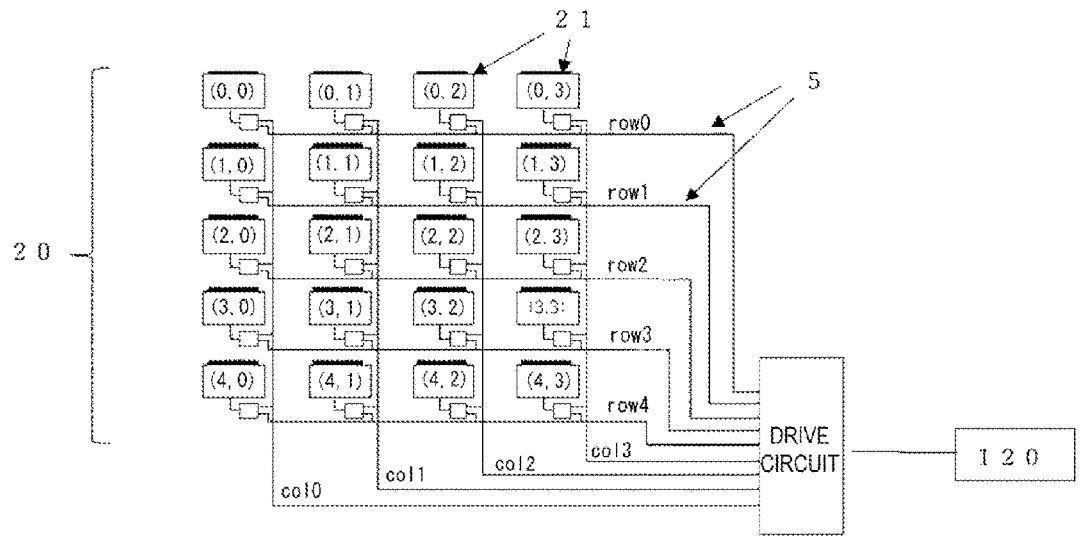
FIG. 16 is a schematic diagram illustrating an example of a connection wiring diagram between each electrodes of the first electrode, each of individual AC drive circuits, and a drive circuit in a case where, in the first electrode and the second electrode of the electrostatic capacitance detection device according to an embodiment of the present disclosure, the first electrode is connected to a processing unit via the individual AC drive circuits and the second electrode is connected to the processing unit via a signal conversion unit.

Each individual AC drive circuit 5 is formed to correspond to each of the electrodes 21 of the first electrode 20, and the individual AC drive circuit 5 is connected via the drive circuit 110 to the processing unit 120 (see FIG. 16). The processing unit 120 controls the individual AC drive circuit 5 via the drive circuit 110 and applies an alternating signal (AC signal) one by one to each of the electrodes 21 of the first electrodes 20. Current is then applied to flow into a certain individual AC drive circuit 5 in a switched off state in which no current is flowing, and is saturated to change to a switched on state. In addition, current to the another individual AC drive circuit 5 in which current is saturated and turned in a switched on state is blocked, and is brought into a switched off state. Therefore, switching of the drive circuit 110 is accomplished. The current flowing in the drive circuit 110 is preferably small from the perspective of reducing power consumption, however, when the current is too small, the current is susceptible to noise, and thus is preferably set to approximately 10 µA to several tens of mA. Note that the drive circuit 110 of the present disclosure is a circuit that drives the individual AC drive circuit 5 and that switching of the drive circuit 110 refers to switching the flow of an output signal from the processing unit to another circuit. In other words, the drive circuit 110 is a circuit having functions of changing the direction in which the current as an output signal flows and controlling the amount of current to flow to a controllable range.

Figure 17:
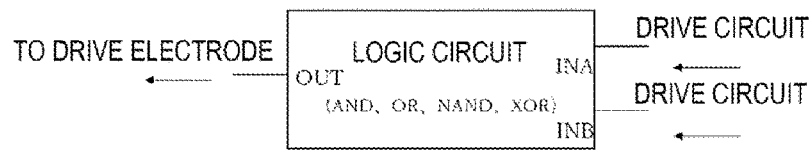
FIG. 17 illustrates a schematic configuration diagram illustrating the individual AC drive circuit formed of a logic circuit and a schematic diagram illustrating signal examples when operating in a case where, in the first electrode and the second electrode of the electrostatic capacitance detection device according to an embodiment of the present disclosure, the first electrode is connected to the processing unit via the individual AC drive circuits and the second electrode is connected to the processing unit via the signal conversion unit.
Figure 17:
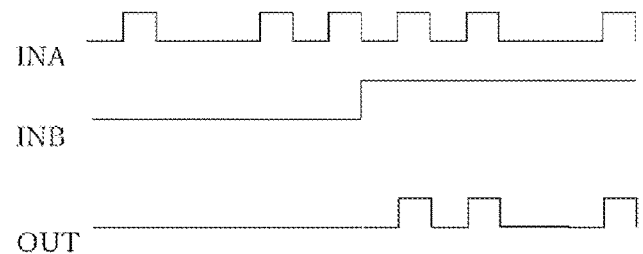

The individual AC drive circuit 5 is a circuit that includes two or more inputs for receiving signals from the drive circuit 110 and one output for outputting an alternating signal to the first electrode 20 and changes the alternating signal in accordance with an input signal pattern from the first electrode 20. The individual AC drive circuit 5 is preferably of a logic circuit type. A type (AND, OR, NAND, XOR) including two inputs and one output can be used in case of the logic circuit type, and thus the number of signal lines can be advantageously reduced. For example, when AND is used, even when a square-wave AC signal is consistently input to INA, the signal is output from OUT only when INB is high (see FIG. 17). Note that in FIG. 16, the individual AC drive electrodes 5 are disposed on the opposite surface of the first electrode 20 with respect to the substrate 10 and connected by through-holes to the first electrode 20, but may be disposed in parallel on the same surface as the first electrode 20.

Figure 18:
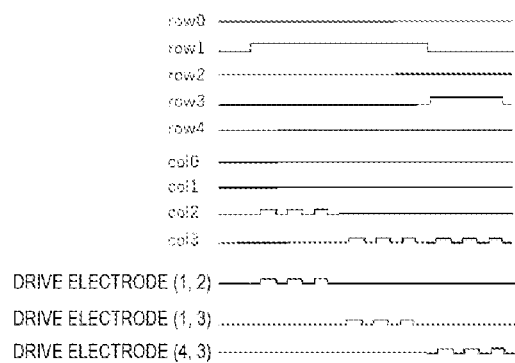
FIG. 18 is a schematic diagram illustrating signal examples of nine signal lines when alternating signals are individually output to three of the electrodes of the first electrode in a case where, in the first electrode and the second electrode of the electrostatic capacitance detection device according to an embodiment of the present disclosure, the first electrode is connected to the processing unit via the individual AC drive circuits and the second electrode is connected to the processing unit via the signal conversion unit.

In addition, actually, connection wiring lines of each of the electrodes 21 of the first electrode 20, the individual AC drive circuits 5, and the drive circuit 110 are often formed of more wiring lines, however, for simplicity of illustration, the first electrode 20 is illustrated with an example of 4×5=20 electrodes in FIG. 16. Common input terminals are used for each of the individual AC drive circuits 5 in the same row, and common input terminals are used for each of the individual AC drive circuits 5 in the same column. Therefore, the drive circuit is controlled by 4+5=9 signal lines from the first electrode 20. For example, FIG. 18 illustrates a signal example of nine signal lines when AC signals are individually output (AC drive) to three electrodes ((col1, row2), (col1, row3), and (col4, row3)) of the electrodes 21 of the first electrode 20 in FIG. 16. This is the case where the individual AC drive circuits 5 are of an AND circuit, and signals are changed as appropriate in the case of other circuits. When the electrodes of the first electrode 20 are individually AC-driven, the second electrode 40 receives a signal in accordance with the size of electrostatic capacitance between each of the electrodes of the first electrode 20 and the second electrode 40.

In a case where the individual AC drive circuit 5 is of a logic circuit type, the electrostatic capacitance detection device 1 may be configured such that each electrostatic capacitance value and each resistance value satisfy a condition of (electrostatic capacitance value generated between the second electrode 40 and the first electrode 20+parasitic capacitance of the first electrode 20)×output resistance value of the logic circuit <1 μs (time constant: 1 microsecond). It is preferable to normally increase the time constant, however, when the time constant is greater than 1 μs, the switching speed may decrease. Note that the time constant is a product of a resistance value and an electrostatic capacitance value in an RC circuit (that is, an electric circuit including a resistor and a capacitor and driven by voltage or current). In addition, the parasitic capacitance is an electrostatic capacitance value resulting from a physical structure that is generated in the first electrode 20 without intention by a designer. Electrode materials of the individual AC drive circuit 5 and the drive circuit 110 are not particularly limited, and not only metal films of copper, silver, gold, nickel, aluminum, or the like but also conductive ink containing these metals, indium tin oxide, zinc oxide, or the like may be used. An example of a forming method includes a method or the like in which a conductive film is formed on an entire surface by a plating method, a sputtering method, a vacuum deposition method, an ion plating method, or the like and thereafter is patterned by etching. The pattern may have any shape such as a round shape, an angular shape, and a linear shape. The thickness is preferably selected in a range of 0.1 μm to 5 mm as appropriate.

The individual AC drive circuit 5 may be formed of a thin film transistor. This is because, although only a square-wave can be output by the simple logic circuit type, a more complex AC signal such as a sine wave can be advantageously output when the individual drive circuit is formed of a thin film transistor. A thin film transistor having a fast switching speed for switching and a large maximum collector current is preferably selected. This is because, when the switching speed is fast, electrostatic capacitance values at the respective electrodes 21 can be measured approximately at the same time, and when the maximum collector current is larger, a signal obtained can be transferred faster. Therefore, when electrical charges stored in the thin film transistors are insufficient (the electrostatic capacitance value is low), the switching speed may be reduced, and thus, it is preferable that a resistance value when the transistors are electrically connected is set to be adequately low. This is because, by reducing the resistance value when the transistors are electrically connected, the current flowing between the transistors is increased, as a result, charging is promoted to sufficiently replenish charges and thus the electrostatic capacitance value increases.

Note that, when the thin film transistors are not electrically connected, normally, it is preferable that a time constant ((electrostatic capacitance value generated between the second electrode 40 and the first electrode 20+electrostatic capacitance value between gate and drain of each thin film transistor+electrostatic capacitance value between source and drain when each thin film transistor is turned off+parasitic capacitance of the drain)×(pull-down resistance value or pull up resistance value within the element)) is adequately increased. Meanwhile, when the time constant is greater than 10 μs, the switching speed may decrease. Therefore, a numerical value of the time constant is preferably less than 10 μs. Note that the pull-down resistance value in the element is a resistor that serves to turn voltage to the Low level (normally, turn a voltage as a signal of a digital circuit to 0 volt) when there is no input (OFF state). Also, the pull-up resistance value in the element is a resistor that serves to turn voltage to the High level (for example, turn a voltage as a signal of a digital circuit to 5 volts) when there is no input (OFF state).

Further, the resistance value when the thin film transistor is turned on is preferably sufficiently smaller than the pull-down resistance value or the pull-up resistance value in the element. Meanwhile, the resistance value when the thin film transistor is turned off is preferably sufficiently greater than the pull-down resistance value or the pull-up resistance value n the element. This is because by setting the pull-down resistance value or the pull-up resistance value in the element as just described, a signal is smoothly transferred. Furthermore, the thin film transistor may be formed of an organic semiconductor. This is because, when being formed of an organic semiconductor, the thin film transistor can be highly mass-produced and also can be applied to a three-dimensional shape such as a curved surface. Examples of a material of such an organic semiconductor include substituted thiophene oligomers such as poly(3-hexylthiophene), pentacene and acene, derivatives thereof, phthalocyanine and thiophene based condensed-ring compounds, and fluorene oligomer derivatives. An example of a forming method includes a drop casting method, a spin coating method, or the like in the case of, for example, poly(3-hexylthiophene). The thickness is preferably selected in a range of 0.1 µm to 5 mm as appropriate.

The second electrode 40 receives an alternating signal emitted from the first electrode 20, and the received alternating signal is converted to a voltage by the signal conversion unit 130 and is further processed by the processing unit 120. The intensity of the alternating signal to be processed is proportional to the electrostatic capacitance value between each electrode of the first electrode 20 and the second electrode 40. As a result, the shear force 60 at the upper portion of each of the electrodes 21 of the first electrode 20 can be measured, and the planar distribution of the shear force 60 can also be measured. The signal conversion unit 130 is a device unit that converts an alternating signal from the second electrode 40 into another signal. Examples of the device configuring the signal conversion unit 130 include a charge amplifier, an AD converter, a distributor, an isolator, a transducer, and the like. In this case, the signal conversion unit 130 may be configured only by a single device. Alternatively, the signal conversion unit 130 may be configured by a combination of a plurality of devices. An example of the combination of the plurality of devices includes a charge amplifier that amplifies and outputs the total amount of current (charge) of the alternating current emitted from the first electrode 20, an AD converter that converts the amplified analogue signal into a digital signal, and the like.

Next, the protecting layer will be described. The protecting layer 50 is a layer for protecting the underlying first electrode 20 and the underlying second electrode 40 from the shear force 60 applied from above the upper portion. Examples of a material of the protecting layer 50 include not only a thermoplastic resin sheet such as acrylic, urethane, fluorine, polyester, polycarbonate, polyacetal, polyamide, or olefin or a thermosetting resin sheet, but also an ultraviolet-curable resin sheet such as cyanoacrylate. However, since the protecting layer 50 is a layer that also exerts a function for accurately transferring the shear force 60 to the insulating layer 30, the protecting layer 50 needs to have characteristics as a pressure transmission body together with characteristics as a protecting layer. Therefore, a preferable material is a polyester resin such as an acrylic resin including 10% or more of an acrylic rubber component, a urethane resin, a fluorine resin, polyethylene terephthalate. While varying depending on the material, the thickness of the protecting layer 50 may be selected between 30 µm and 5 mm as appropriate.

Note that when the second electrode 40 is formed of a plurality of linear patterns, the surface of the protecting layer 50 may include cut-in to prevent interference of electric signals detected in each of the linear patterns which causes noise affecting the sensitivity of the electrostatic capacitance value to be measured. Since each of the linear patterns of the second electrode 40 is independently moved due to the cut-in, adverse effects on other electrodes can be advantageously reduced. In a case where such a cut-in is made, the thickness of the insulating layer 30 is preferably slightly large in a range of 500 µm to 5 mm. Examples of the form of the cut-in include a dotted line, a dashed line, a long dashed line, a long dashed short dashed line, a long dashed double-dotted line, and the like. The cut-in may be a single line or a plurality of lines. The depth of the cut-in may be formed through the protecting layer 50 to the surface of the insulating layer 30 or may be formed halfway in a half-cut shape. An example of a method for making a cut-in includes a punching method or the like with a Thomson blade.

Figure 19:
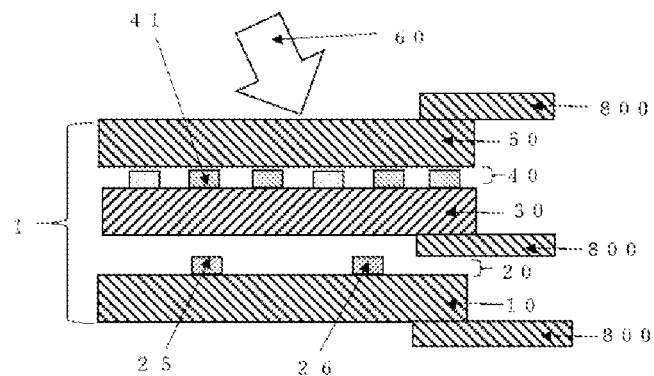
FIG. 19 is a schematic diagram illustrating an example in which a temperature sensor is provided in the electrostatic capacitance detection device according to an embodiment of the present disclosure.

Next, a temperature sensor will be described. The electrostatic capacitance detection device 1 according to the present disclosure may also be provided with temperature sensors 800 configured to measure heat generated by stress of the shear force 60 at layers of the substrate 10, the insulating layer 30, and the protecting layer 50 (see FIG. 19). This is because, in the case of a device for detecting an electric signal such as an electrostatic capacitance value, the device may be influenced by ambient temperature, and therefore in order to minimize the influence, the ambient temperature is measured in real time and the measurement value is appropriately corrected. In particular, since considerable friction or the like with the ground contact surface is generated in a case where a pressured body is a tire or the like, heat is generated due to the friction or the like. Therefore, the accuracy of a measurement value may decrease. In addition, when the amount of loss of energy due to heat is estimated, what is the state of the ground contact surface where the amount of loss is small is estimated, and thus the research and development of energy-efficient products can be advantageously promoted.

Each of the temperature sensors 800 preferably uses a thin film sheet having a thickness of 20 µm to 3 mm, which can be pasted, or an electrode added to each element of the first electrode. Since the temperature sensor is not bulky, the temperature sensor can be placed at various locations at the electrostatic capacitance detection device 1, and thus the temperature sensor can advantageously detect in which location of the electrostatic capacitance detection device 1 heat is generated and accumulated. As a result, it is advantageous that the distribution of the shear force 60 and the temperature can be simultaneously measured. An example of the temperature sensor 800 formed of the thin film sheet includes a film-type thermistor temperature sensor or the like in which a thermistor material layer and a temperature sensor electrode are layered on a thin film sheet. The film-type thermistor temperature sensor is configured such that a thermistor material layer, the resistance value of which decreases or increases as the temperature rises, is formed by patterning, and the film-type thermistor temperature sensor measures temperature by measuring a change of the resistance value with a temperature sensor electrode. Examples of the thin film sheet include not only synthetic resin sheets such as polyimide, polyethylene terephthalate, polyethylene naphthalate, polysulfone, polyetherimide, polyetheretherketone, polycarbonate, polyacetal, and liquid crystal polymer but also thin film glass, ceramics, heat resistant non-woven fabrics, and the like. Alternatively, the thin film sheet may be a sheet configured such that a heat-resistant insulating film is formed on a metal sheet. The thickness is preferably selected in a range of 20 µm to 3 mm as appropriate.

Examples of a material of the thermistor material layer include not only oxides of transition metals such as manganese, cobalt, and iron, but also nitrides made of any of thallium, niobium, chromium, titanium, and zirconium and any of aluminum, silicone, and bismuth. An example of a method for manufacturing the former material includes a method in which the oxides of the transition metals described above are used as a raw material and these are mixed together by a mixer, and then temporarily baked and formed into granules having an appropriate size by using a granulation method such as a pressure granulation method, a spray drying method, or the like, and pressure molded into desired shape. An example of a method for manufacturing the latter material includes a method in which a material containing the elements described above is used as a target and patterned by sputtering in an atmosphere containing nitrogen gas. Note that these thermistor material layers are preferably subjected to final heat treatment at high temperature in order to obtain stable thermistor characteristics. An example of a material of the temperature sensor electrode includes a metallic electrode layer such as gold, silver, or palladium, and is preferably patterned into a tandem type or the like with glass fine powder (glass frit). In order to improve bonding properties, a bonding layer of chromium, nickel chromium, titanium nitride, or the like may be provided between the thin film sheet and the temperature sensor electrode. After forming the temperature sensor electrode, a lead wire may be attached and sealed with an epoxy resin or the like to protect the thermistor material layer and the temperature sensor electrode.

Figure 20:
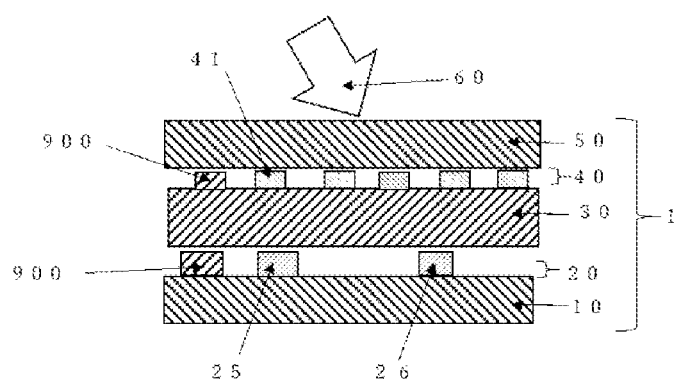
FIG. 20 is a schematic diagram illustrating an example in which temperature detection electrodes are provided near the first electrode and the second electrode in the electrostatic capacitance detection device according to an embodiment of the present disclosure.

Others as temperature sensors other than thermistors may be applied, and the temperature sensors are of a thermocouple type configured such that two different types of metals are connected and electromotive force generated by a temperature difference between contacts of the metals is utilized, a temperature measurement resistor type that utilizes the fact that the electric resistance of metal changes substantially in proportion to temperature, a thermal expansion type that utilizes expansion and shrinkage of liquid or gas due to a temperature change, a bimetal type that utilizes a phenomenon in which when a temperature of a metal plate of two thin metal plates having different thermal expansion coefficients and affixed together is changed with one end of the metal plate fixed, the metal plate is warped toward either one side due to the difference between thermal expansion coefficients, and the like. Further, the temperature sensor 800 may function only with an electrode additionally formed in parallel with each element of the first electrode 20 or the second electrode 40. In other words, temperature detection electrodes 900 each formed of a semiconductor or the like may be disposed near the first electrode 20 and the second electrode 40 to be replaced with the temperature sensors 800 (see FIG. 20). The temperature detection electrode 900 has one end side connected to the control power supply via a resistor for limiting current, and the other end side connected to a ground side terminal. In addition, the control power supply corresponds to a current source that allows a current in the forward direction to flow to the temperature detection electrode. The temperature detection electrode 900 may be formed of not only metal electrode layers of gold, silver, palladium, or the like but also conductive paste films obtained by dispersing these metallic particles in a resin binder, an organic semiconductor of polyhexylthiophene, polydioctylfluoren, pentacene, tetrabenzoporphyrin, or the like. An example of a method for manufacturing the temperature detection electrode 900 in the former case includes a method in which the entire surface of a conductive film is formed by a plating method, a sputtering method, a vacuum deposition method, an ion plating method, or the like and is thereafter patterned by etching. An example of a method for manufacturing the temperature detection electrode 900 in the latter case includes a method in which the surface is directly patterned by a printing method or the like such as screen printing, gravure printing, or offset printing.

Figure 21:
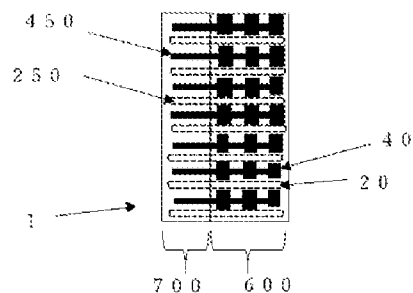
FIG. 21 is a schematic plan view illustrating an example in which, in the electrostatic capacitance detection device according to an embodiment of the present disclosure, the positions of the first electrode and the second electrode and the position of lead-out wiring lines are slightly shifted and formed into a parallel pattern so that a frame portion is not present in either one of two directions orthogonal to the surroundings of a sensing unit of the first electrode and the second electrode.

Next, a frame portion 700 in which lead-out lines of the first electrode 20 and the second electrode 40 are formed will be described. The electrostatic capacitance detection device 1 is preferably configured such that the frame portion 700 is not present in either one of two directions orthogonal to the surroundings of a sensing unit 600 of the first electrode 20 and the second electrode 40 (see FIG. 21). When a space for providing lead-out wiring lines is required in two directions orthogonal to the sensing unit 600, at an upper side or a lower side and a right side or a left side of the sensing unit 600, the shear force 60 cannot be measured in a region where the lead-out wiring lines are formed; therefore, the length of a measurable range is limited. Meanwhile, when the frame portion 700 is not present in either one of two directions orthogonal to the surroundings of the sensing unit 600 of the first electrode 20 and the second electrode 40 of the electrostatic capacitance detection device 1, the length of a measurable range can be increased maximally by arranging a plurality of the electrostatic capacitance detection devices 1 and connecting the electrostatic capacitance detection devices 1 into an elongated shape.

When the sensing unit 600 can be extended to a desired length, advantageously, items that have been conventionally difficult to measure, for example, the degree of variation in pressure or shear force value due to fine recesses and protrusions at each location of a tire, and a change of the shear force 60 applied when the traveling speed of the tire or the like is accelerated or decelerated, can be easily detected. A method for configuring the frame portion 700 so as not to be located at the upper side and the lower side of the sensing unit 600 is not particularly limited, and an example thereof includes a method in which the first electrode 20 and the second electrode 40 are slightly dislocated from each other and pattern-formed in parallel with each other, and a lead-out wiring line 250 and a lead-out wiring line 450 are slightly dislocated from each other and pattern-formed in parallel with each other (see FIG. 21). Note that in a case where the required accuracy and resolution of measurement values of the shear force 60 are increased and the lead-out wiring line 250 and the lead-out wiring line 450 need to include a multiple numbers of lines and be formed of fine lines, the frame portions 700 may be provided on the left and right sides of the sensing unit 600, and the lead-out wiring line 250 and the lead-out wiring line 450 may be formed of separate lines for the left and right sides to expand an interval between the lead-out wiring lines.

Figure 22:
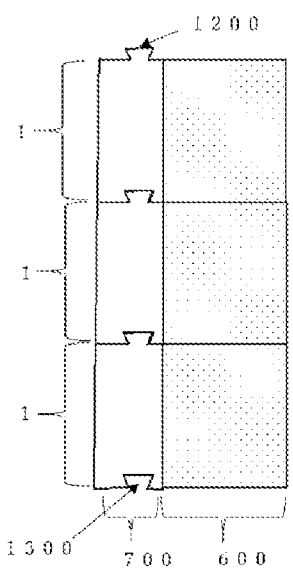
FIG. 22 is a schematic plan view illustrating an example in which, in a case where a plurality of the electrostatic capacitance detection devices according to an embodiment of the present disclosure is connected vertically in a column, a protrusion and a recess which have a lock-and-key relation are provided on a portion of each of the electrostatic capacitance detection devices so that the electrostatic capacitance detection devices do not move and shift.

Further, by bending a portion of the lead-out wiring line 250 near the first electrode 20 and a portion of the lead-out wiring line 450 near the second electrode 40 at a right angle to substantially increase the length of the lead-out wiring line, the number of lead-out wiring lines 250 and the lead-out wiring lines 450 can be reduced to almost half. As a result, the design flexibility of the line width of the lead-out wiring line 250 and the lead-out wiring line 450 is increased, therefore, the first electrode 20 and the second electrode 40 can be made finer, and the accuracy and resolution of measurement values of the shear force 60 can be further increased. Furthermore, in a case where a plurality of the electrostatic capacitance detection devices 1 are arranged and connected together, a protrusion 1200 and a recess 1300, which have a lock-and-key relation may be provided on a portion of the electrostatic capacitance detection device 1 so that the electrostatic capacitance detection device 1 is prevented from being moved and dislocated (see FIG. 22).

By securely fitting the protrusion 1200 into the recess 1300, a plurality of the electrostatic capacitance detection devices 1 has the same function as one integrated and elongated electrostatic capacitance detection device 1. The protrusion 1200 and the recess 1300 may be formed at the frame portion 700 or may be formed at the sensing unit 600. In addition, the protrusion 1200 and the recess 1300 may be formed in any shape as long as the protrusion 1200 and the recess 1300 have a lock-and-key relation so as not to disengage from each other.

The elongated electrostatic capacitance detection device 1 described above may be applied to many usages, not only tire traveling tests but also the case of measurement of the shear force 60 applied to a shoe sole when a person walks or runs, force exerted by a golf ball to a ground surface in golf putting, force exerted by a bowling ball during traveling in a lane, force exerted when a person traces his/her finger on a display surface of an IT equipment, force exerted by train on a rail when traveling, and like. For example, in walking or running by a person, contact points with the ground contact surface are placed at intervals, and the length of walking or running stride depends on the person, and the length of walking or running stride is not the same for each person at the start and end of walking or running. Therefore, when the sensing unit 600 is formed on an entire elongated surface, measurement can be made in any length of walking or running stride, and thus the elongated electrostatic capacitance detection device 1 described above has high usability.

In addition, when a very severe test such as a tire traveling test is repeatedly performed several times on the electrostatic capacitance detection device 1, the protecting layer 5 or the like on the surface becomes worn off and the second electrode 40 or the like is damaged and becomes unusable, and each time, another electrostatic capacitance detection device needs to be sourced, which may cause a significant cost increase from a tester's perspective. As a result, all or a portion of the worn protecting layer 50, the insulating layer 30 of the damaged second electrode 40, and the substrate 10 of the damaged first electrode 20 may be configured to be removable and may be replaced with new ones for use as appropriate. Here, "removable" means that it is possible to remove them separately with any means, and any means or time for removal is of no concern. Also, in a case where a portion of the layer is separated and not completely removed and the removed layer has its own original function, it is considered that the layer is removed.

Figure 23:
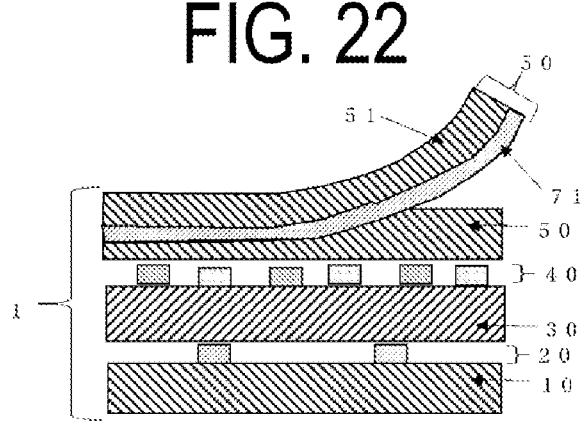
FIG. 23 is a schematic cross-sectional view illustrating an example in which a portion of a protecting layer is being removed in the electrostatic capacitance detection device according to an embodiment of the present disclosure.

The removable protecting layer 50 or the like is preferably configured in a layer structure of a plurality of layers such that only the protecting layer 50 formed of a base material 51 and a layer 71 of self-adsorption glue or minute suckers can be removed and replaced (see FIG. 23). With such a configuration, only a portion of the worn protecting layer 50 can be peeled and removed from the electrostatic capacitance detection device 1 to be replaced very easily (see FIG. 23), which advantageously leads to a significant cost reduction from a tester's perspective.

Examples of a material of the self-adsorption glue include not only a two-part curing type urethane-based resin formed of polyol and a polyisocyanate cross-linking agent or the like, and a synthetic rubber-based resin of styrene-butadiene latex, butadiene rubber, nitrile rubber, isoprene rubber, chloroprene rubber, or the like, but also a natural rubber resin, an acrylic resin, a silicone resin, or the like. A method for forming the self-adsorption glue layer is not particularly limited, and the self-adsorption glue layer may be formed by coating by a general-purpose printing method such as offset printing, screen printing, or the like or with a general-purpose coater such as a lip coater, a reverse coater, or the like to form a thickness of 10 to 500 μm.

The minute suckers have properties of pressure-sensitive adsorption when the adherend surface is flat and smooth. Further, the minute suckers can be easily manually peeled without generating stickiness as an adhesive. The minute suckers preferably include sucker-shaped micropores of 1 to 500 μm, which are formed in a ratio of one to hundred thousand micropores per square centimeter. When the size of the suckers is less than 2 μm, the suction effect is generated due to the difference in air pressure when flexibly sucked with a contact surface. When the average size of the sucker-shaped micropores is less than 1 μm and only one thousand micropores are formed per square centimeter, or when the average size of the sucker-shaped micropores is greater than 500 μm and hundred thousand or more micropores are formed per square centimeter, the adsorption power may decrease. A method is preferable as a method for forming the minute suckers, in which by mechanically blowing air into synthetic resin emulsion liquid, an infinite number of fine bubbles are produced to form foamy synthetic resin emulsion liquid, the synthetic resin emulsion liquid is applied with a coater or by spaying, and the solvent is scattered and removed.

BRIEF DESCRIPTION OF THE REFERENCE NUMERALS

1 Electrostatic capacitance detection device
5 Individual AC drive circuit
10 Substrate
20 First electrode
21 Lower first electrode
22 Upper first electrode
25, 26, 27 Each electrode of first electrode
30, 31, 32 Insulating Layer
40, 45, 46 Second Electrode
41, 402 Lower second electrode
42, 402 Upper second electrode
45, 46, 47 Each electrode of second electrode
50 Protecting layer
51 Base material of protecting layer
60 Shear force
65 Component force of shear force in X-axis direction
66 Component force of shear force in Y-axis direction
70 Counterbore-shaped recesses and protrusions
71 Layer formed of self-adsorption glue or minute suckers
80 Conductive particle
100 Electrostatic capacitance detection device group
110 Drive circuit
120 Processing unit
130 Signal conversion unit
250, 450 Lead-out wiring line
300 Bubble size
600 Sensing unit
700 Frame portion
800 Temperature sensor
900 Temperature detection electrode
1200 Protrusion
1300 Recess
S1 Region overlapping with a portion of the island-shaped pattern of the first electrode and a portion of the pattern of the upper second electrode in a plan view
S2 Region overlapping with a portion of the island-shaped pattern of the first electrode and a portion of the pattern of the lower second electrode in a plan view
S1' Region where an electrostatic capacitance value, which increases between the first electrode and the upper second electrode due to a component force in the X-axis direction applied from right to left on the plane of paper, can be detected
S2' Region where an electrostatic capacitance value, which increases between the first electrode and the lower second electrode due to a component force in the Y-axis direction applied from top to bottom on the plane of paper, can be detected
t20 Average distance in the thickness direction between the first electrode in the island-shaped pattern and the lower second electrode t40 Average distance in the thickness direction between the first electrode in the island-shaped pattern and the upper second electrode d20 Distance in the pattern direction of the lower second electrode, which is a distance in the short-side direction of the first electrode in a plan view d40 Distance in the pattern direction of the upper second electrode, which is a near distance between intersection end portions in which the upper second electrode and the lower second electrode intersect in a plan view

The invention claimed is:

1. An electrostatic capacitance detection device formed with a first electrode, an insulating layer on the first electrode, and a second electrode on the insulating layer, the electrostatic capacitance detection device configured to calculate a shear force applied from above an upper portion of the second electrode, wherein the first electrode is formed of an island-shaped pattern, the island shaped patterns comprise rectangular shapes, rectangular shapes with rounded corners, parallelograms, parallelograms with rounded corners, or ovals, the second electrode is formed of two layers of an upper second electrode and a lower second electrode, an insulating film is interposed between the upper second electrode and the lower second electrode, and the upper second electrode and the lower second electrode are formed of a plurality of linear patterns intersecting in a plan view, a portion of the island-shaped pattern of the first electrode overlaps with a portion of the pattern of the upper second electrode and a portion of the pattern of the lower second electrode in a plan view, and the lower second electrode is located between the upper second electrode and the first electrode, a region where a portion of the island-shaped pattern of the first electrode overlaps with a portion of the pattern of the upper second electrode in a planer view is larger than a region where a portion of the island-shaped pattern of the first electrode overlaps with a portion of the pattern of the lower second electrode in a planer view.

2. The electrostatic capacitance detection device according to claim 1, wherein the first electrode includes a plurality of electrodes, the electrostatic capacitance detection device further includes a plurality of AC drive circuits, each of the electrodes of the first electrode is connected to a processing unit via one AC drive circuit, the processing unit controls the AC drive circuits via a drive circuit, each of the AC drive circuits is a circuit that includes two or more inputs configured to receive signals from the drive circuit and one output configured to output an alternating signal to each of the electrodes of the first electrode and is configured to respectively apply the alternating signal to the each of the electrodes of the first electrode in accordance with an input signal pattern from the drive circuit, and the second electrode is connected via a signal conversion unit to the processing unit.

3. The electrostatic capacitance detection device according to claim 1, wherein the insulating layer is formed of a plurality of layers sequentially stacked with each other, and the plurality of insulating layers are configured such that a layer having a low elastic modulus is stacked on a layer having a high elastic modulus.

4. The electrostatic capacitance detection device according to claim 1, wherein the insulating layer is formed of a plurality of layers sequentially stacked with each other, and the plurality of insulating layers are formed of a plurality of foams having different bubble sizes.

5. The electrostatic capacitance detection device according to claim 1, wherein the insulating layer is formed of a plurality of layers sequentially stacked with each other, and the plurality of insulating layers are formed of a plurality of electrorheological fluids having different viscoelasticity.

6. The electrostatic capacitance detection device according to claim 1, wherein the insulating layer is formed of a plurality of layers sequentially stacked with each other, and a protecting layer is formed on the second electrode, and the protecting layer includes cut-in on its surface.

7. The electrostatic capacitance detection device according to claim 1, wherein the insulating layer has a multi-layer structure made of foams of an identical material that are sequentially stacked with each other, and the insulating layer has gradation such that a hardness or elastic modulus of the material changes in a stepwise manner in a certain direction.

8. The electrostatic capacitance detection device according to claim 1, wherein the insulating layer has gradation such that physical properties or chemical properties change in a stepwise manner in a certain direction, and the insulating layer is formed of a single layer.

9. The electrostatic capacitance detection device according to claim 8, wherein the insulating layer is formed of a foam having gradation such that a bubble concentration or bubble size changes in a stepwise manner.

* * * * *